United States Patent [19]

Reed et al.

[11] Patent Number: 5,285,752
[45] Date of Patent: Feb. 15, 1994

[54] INTERNAL COMBUSTION ENGINE

[75] Inventors: Jay L. Reed, Ovideo; Roger A. Villecco, Mary Esther, both of Fla.; Robert V. Frierson, Atlanta, Ga.

[73] Assignee: Single-Stroke Motors, Inc., Valpariso, Fla.

[21] Appl. No.: 53,249

[22] Filed: Apr. 23, 1993

[51] Int. Cl.$^5$ ............................................. F02B 33/06
[52] U.S. Cl. ................................ 123/61 R; 123/71 R
[58] Field of Search .................. 123/61 R, 71 R, 62, 123/46 R, 196 AB, 41.33, 41.42, 197

[56] References Cited

U.S. PATENT DOCUMENTS

| | | | |
|---|---|---|---|
| 567,530 | 9/1896 | Willetts | 123/62 |
| 809,841 | 1/1906 | Petzel | 123/61 R |
| 1,040,472 | 10/1912 | Wade | 123/62 |
| 1,215,383 | 2/1917 | Kenyon | 123/62 |
| 1,463,973 | 8/1923 | Rice | 123/71 R |
| 2,304,407 | 12/1942 | Hogan | 123/62 |
| 2,392,052 | 1/1946 | Matheisel | 123/61 R |
| 2,918,045 | 12/1959 | Brown | 123/62 |
| 2,944,535 | 7/1960 | Fikse | 123/46 R |
| 3,559,628 | 2/1971 | Boldery | 123/62 |
| 3,824,970 | 7/1974 | Amery | 123/45 R |
| 3,955,543 | 5/1976 | Brown | 123/61 R |
| 4,373,474 | 2/1983 | Schindler et al. | 123/56 B |
| 4,385,597 | 5/1983 | Steizer | 123/62 |
| 4,414,927 | 11/1983 | Simon | 123/62 |

OTHER PUBLICATIONS

Schweitzer, Paul H., *Scavenging of Two-Stroke Cycle Diesel Engines*, MacMillan Co., New York Dec.-(1949). see section 2.3, p. 17.
Taylor, et al., *The Internal Combustion Engine*, Int'l Textbook Company, Scranton Pa., 2nd Edition, Dec.-(1962), pp. 272 & 461.
Lichty, L., *Internal Combustion Engines*, McGraw-Hill, 5th Edition, Dec.-(1939), pp. 502-503 & 509.
Maleev, V. L., *Internal Combustion Engines*, McGraw-Hill, 2nd Edition, Dec.-(1945), pp. 384 to 386.
Degler, H., *Internal Combustion Engines*, John Wiley & Sons, Dec.-(1938), pp. 178-179.
George, P. E. and Corliss, J. M., *Development of a Rotary Valve for Pulse Combustion Applications*, Final Report to the Gas Research Institute, Report No. GRI--88/0185, (Oct. 1988).

*Primary Examiner*—Tony M. Argenbright
*Assistant Examiner*—M. Macy

[57] ABSTRACT

A single piston internal combustion engine is described that produces two power impulses per revolution of the crankshaft, precise mechanical balance, zero side thrust upon the piston, and purified exhaust gas. The lubrication oil is isolated from contamination by blowby and fuel dilution. Total engine cooling is obtained from the lubrication oil. The engine is free from shock loads as it is cushioned by continuously compressing gas in preparation for the next combustion event. The engine is uniflow-scavenged utilizing piston pumps whose fresh air intake is controlled by rotary valves. The piston pumps possess compact aftercoolers used in combination with supercharging. The exhaust header assists in silencing the engine and removes fluctuations in exhaust pressure. A computer-aided specialized mechanical balance methodology is disclosed that obtains counterbalance weights to optimally reduce engine shaking forces. The engine is suitable for operating on alternative fuels such as liquified natural gas, and alcohol.

12 Claims, 19 Drawing Sheets

```
      program balance
c
c     all units are anglo-saxon
c
c     ****************************************************************
c     variable definations
c
c     a   =   pitch circle radius of crankpin gears
c     b   =   crank arm length
c     L   =   connecting-rod length (center-to-center)
c     r   =   connecting-rod radius of gyration (from crankpin center)
c     f   =   one-half of center-to-center separation of piston-pins
c     c1  =   radius arm to counterbalance weight C.M.s on crankpin gears
c     c2  =   radius arm to counterbalance weight C.M.s on idler gears
c     mp  =   mass of piston assembly plus the mass of the piston rings
c             plus the mass of the cooling oil
c     mc  =   mass of both connecting-rods
c     mj  =   mass of both crankpins, including bearings and nuts,
c             minus the mass of all material drilled from crankpin gears
c             for crankpin installation
c     m1  =   total mass of four crankpin gear counterbalance weights
c     m2  =   total mass of four idler gear counterbalance weights
c     theta =  limits on integral
c     theta1 = angular position of left crankpin gear counterbalance weight,
c              measured clockwise from crankarm pointing right
c     theta2 = angular position of left idler gear counterbalance weight,
c              measured clockwise from a zero degree ray pointing right and
c              parallel to aforesaid right pointing crank arm
c     ****************************************************************
c
      implicit real*8(a-h,k-z)
      dimension k(5)
      pi = 3.1415926
c
c     read input file
c
      call input(a,b,L,r,f,c1,c2,mp,mc,mj,me)
c
      alpha = abs((a-f)/L)
      beta  = b/L
      gamma = r/L
      numloop = 1000
      dx = pi/numloop
      write(6,200)
 200  format(1x,'****************************************************')
c
c     integrate by trapezoidal rule
c
      do 10 i = 1,5
        ai = dfloat(i)
        theta = 0.
        temp = dsqrt(1.-(alpha-beta*dcos(theta))**2)*dcos(ai*theta)
        do 20 j = 2,numloop
          theta = (dfloat(j)-1.)*dx
          temp = temp + 2.*dsqrt(1.-(alpha-beta*dcos(theta))**2)
     *                 *dcos(ai*theta)
 20     continue
        theta = pi
        temp = temp + dsqrt(1.-(alpha-beta*dcos(theta))**2)
     *               *dcos(ai*theta)
        k(i) = 2./pi*(dx/2.)*temp
 10   continue
      write(6,110)k(1),k(2),k(3),k(4),k(5)
 110  format(/,t11,'K series',//,1x,'K(1)',t15,'=',f9.6,/,1x,'K(2)',
```

Fig. 14A

```
            1       t15,'=',f9.6,/,1x,'K(3)',t15,'=',f9.6,/,1x,'K(4)',t15,
            2       '=',f9.6,/,1x,'K(5)',t15,'=',f9.6,///,t3,
            3       'Counterbalance Weights',/)
c
      theta1    = pi-datan(k(1)*L*(mp+gamma*mc)/(b*(mp+mc+mj)))
      theta1    = theta1*180./pi
      theta2    = (pi/2)*180./pi
      m1        = dsqrt(b**2*(mp+mc+mj)**2+L**2*(mp+gamma*mc)**2*k(1)**2)
     1            /c1
      m2        = -L*(mp+gamma*mc)*k(2)/c2
      m1        = m1/4.
      m2        = m2/4.
      excursion = 2.*L*(mp+gamma*mc)*k(3)/me
      write(6,100)theta1,theta2,m1,m2,excursion
  100 format(1x,'Theta1',t15,'=',f9.4,t30,'degrees',/,
     1       1x,'Theta2',t15,'=',f9.4,t30,'degrees',/,
     2       1x,'m1',t15,'=',f9.4,t30,'pounds/gear',/,
     3       1x,'m2',t15,'=',f9.4,t30,'pounds/gear',/,
     2       1x,'Excursion',t15,'=',f9.4,t30,'inches',/)
      write(6,200)
c
c     compute excursion envelope
c
      biga      = 0.
      bigb      = (b*(mp+mc+mj) + c1*m1*dcos(theta1*pi/180.))/me
      bigc      = (L*(mp+gamma*mc)*k(1) - c1*m1*dsin(theta1*pi/180.))
     1            /me
      bigd      = (c2*m2*dcos(theta2*pi/180.))/me
      bige      = (c2*m2*dsin(theta2*pi/180.) + L*(mp+gamma*mc)*k(2))
     1            /me
      F3        = (L*(mp + gamma*mc)*k(3))/me
      F4        = (L*(mp + gamma*mc)*k(4))/me
      do 30 i = 0,360
      phi       = (i)*pi/180.
      S         = biga - bigb*dsin(phi) - bigc*dcos(phi) -
     1            bigd*dsin(2.*phi) - bige*dcos(2.*phi) -
     2            F3*dcos(3.*phi) - F4*dcos(4.*phi)
      Sbal      = biga - F3*dcos(3.*phi) - F4*dcos(4.*phi)
      write(7,300)phi*180./pi,S,Sbal
  300 format(1x,3f12.5)
   30 continue
      end
c
c     ***************************************************************
c     read input file
c     ***************************************************************
      subroutine input(a,b,L,r,f,c1,c2,mp,mc,mj,me)
      implicit real*8(a-h,k-z)
      open (5,file= 'balance.in', status= 'unknown')
      open (6,file= 'balance.out', status= 'unknown')
      open (7,file= 'balance.num', status= 'unknown')
      read(5,*)a
      read(5,*)b
      read(5,*)L
      read(5,*)r
      read(5,*)f
      read(5,*)c1
      read(5,*)c2
      read(5,*)mp
      read(5,*)mc
      read(5,*)mj
      read(5,*)me
      close (5)
c     ***************************************************************
c     echo input
```

Fig. 14B

```
c     ****************************************************************
      write(6,100)a,b,L,r,f,c1
      write(6,200)c2,mp,mc,mj,me
 100  format(8x,'Engine Geometry',//,
     1       1x,f8.4,t15,'pitch circle radius of crankpin gears',/,
     2       1x,f8.4,t15,'crank arm length',/,
     3       1x,f8.4,t15,'connecting-rod length (center-to-center)',/
     4       1x,f8.4,t15,'connecting-rod radius of gyration',
     5                  ' (from crankpin center)',/,
     6       1x,f8.4,t15,'one-half center-to-center separation of ',
     7                  'piston pins',/,
     8       1x,f8.4,t15,'radius arm to counterbalance weight C.M.s',
     9                  ' on crankpin gears')
 200  format(1x,f8.4,t15,'radius arm to counterbalance weight C.M.s',
     1                  ' on idler gears',/,
     2       1x,f8.4,t15,'mass of piston assembly',/,
     3       1x,f8.4,t15,'mass of both connecting-rods',/,
     4       1x,f8.4,t15,'total mass of both crankpins',/,
     5       1x,f8.4,t15,'mass of engine',/)
      return
      end
```

Fig. 14C

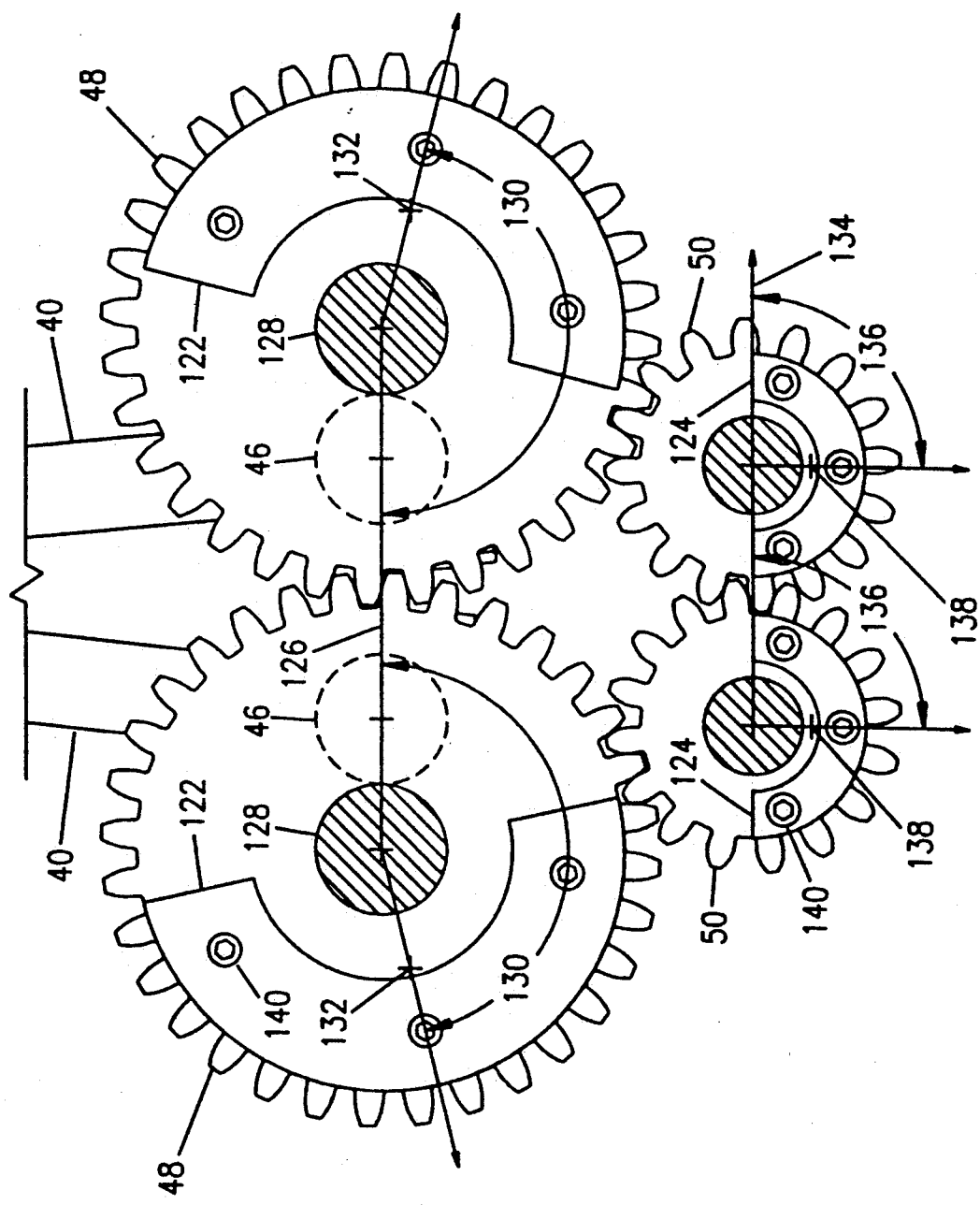

INTERNAL COMBUSTION ENGINE

BACKGROUND OF THE INVENTION

1. Field of the Invention

The present invention relates to improvements in two-stroke cycle internal combustion engines suitable for automotive, marine, and stationary power.

2. Description of the Prior Art

Two-stroke cycle spark-ignition engines have long found commercial success in applications other than heavy automobile propulsion. They were previously employed in very light economy cars, motorcycles, and small service vehicles. The two-stroke engine was used as an automobile power plant in Europe but was abandoned by Saab and Auto Union by the late 1960's. The Japanese continued using the two-stroke until the end of the 1970's. The two-stroke is currently used in eastern Germany for economy cars.

The automotive two-stroke engines disappeared because they did not fulfill emission control standards. Additionally, the prior art designs consumed more fuel and ran rougher than their four-stroke counterparts. The two-stroke produced dirty exhaust partly because of the necessity of mixing large amounts of oil with the fuel to obtain crank lubrication.

The limited application of the two-stroke isolated it from heavy development, as well as most of the advances in the combustion arts, for the past two decades.

Intense interest in the two-stroke for automotive application is on the rise. General Motors, Ford, Chrysler, and Japan are involved in two-stroke projects. It is reported that Chrysler will have a high-performance two-stroke V-6 passenger car in production by 1997. General Motors is investing in an engine design proposed by Orbital Engine Co. of Australia.

Some analysts and engineers predict that if industrial and scientific might is intelligently focused on the two-stroke it will signal the beginning of a new era in automotive propulsion.

The potential benefits of two-stroke engines are its simplicity, light weight, and a power stroke in each cylinder during each revolution of the crankshaft.

The relatively small size of the two-stroke engine can produce low hood lines in road automobiles, which have an aerodynamic as well as aesthetic value.

The two-stroke offers the potential of large power outputs per unit of engine displacement. It is well known by motorcycle engineers that racing two-strokes have exceeded specific outputs of 400 horsepower per liter. Also, marine outboard motors of high power to weight ratios are commercially available as stock items.

Very well designed prior art two-stroke spark ignition engines attained 90 percent of the gasoline mileage of well designed four-stroke counterparts. A portion of the poorer gasoline mileage and dirty exhaust is due to the exhaust port remaining open during the scavenging process, thereby allowing leakage of fresh mixture out the exhaust system. Another portion of the poor mileage and dirty exhaust is due to spurious misfires or pre-ignition at light loads, which is poorly understood because of limited investigation.

With the development of computer controlled engine management and direct fuel injection, the dirty exhaust, rough running, and mileage limitations of the prior art two-stroke designs can be removed, because the air to fuel ratio and spark timing can be monitored and controlled in realtime, throughout the engine's speed range, in harmony with its instantaneous load.

SUMMARY OF THE INVENTION

The present invention is a single piston two-stroke cycle engine that produces two power strokes per crankshaft revolution, precise mechanical balance, and purified exhaust gas.

The piston experiences zero side-thrust, in contrast to ordinary piston engines, and so quietly reciprocates with little noise since it is free from so-called piston "slap." The piston rings bear uniformly, at all times, producing even wear and an optimal heat transfer path between the cylinder wall and piston.

A single piston design achieves an extreme mechanical rigidity, and removes torsional flexures that occur in the crankshafts of multi-cylinder engines. The design requires a minimum of parts and obtains a highly desirable physical compactness.

Ordinary single piston engines will be approximately 50 percent in mechanical balance. It is common knowledge that such engines shake vigorously and produce noise and sympathetic vibrations even with the aid of shock abatement techniques. Importantly, the lack of mechanical balance stresses the engine, via live shock loads, and limits the power output ceiling.

The engine of the present invention is very near 100 percent in mechanical balance, thereby eliminating the shaking forces and producing very low main bearing pressures. Throughout its speed range, from idle to full throttle, the engine's envelope of vibration will be less than one or two thousandths of an inch wide.

In ordinary piston engines there are periods during the engine's cycle that the reciprocating mass accumulates kinetic energy rather than doing useful work. During changes of the mass' direction of motion, the aforementioned kinetic energy is suddenly converted and stored in the form of strain energy in the elastic engine. However, the reciprocating mass of the engine of the present invention is cushioned by continuously compressing gas in preparation for the next combustion event; thereby doing useful and recoverable work, and not producing unwanted mechanical stresses.

The crankcase of the engine of the present invention is isolated from the power cylinder and takes no part in the two-stroke cycle scavenging process, and by this means the crank assembly is force lubricated, without the oil entering into the power cylinder to dirty the exhaust. The crankcase oil is in turn isolated from the blowby during the power stroke and cannot easily be diluted with fuel or contaminated by combustion products.

By experiencing two power strokes per crankshaft revolution, the double-acting power piston receives twice the heat load of a piston in a single-acting two-stroke engine. The power piston of the present invention is configured so that cool lubrication oil is forced through its interior to extract heat. Because the power piston is a relatively cool body absorbing heat in the power cylinder there is no need of a water jacket. The engine's radiator is small due to the small thermal impedance of the engine's heat path.

The engine utilizes piston-type scavenging pumps whose fresh air intake is controlled by rotary disc valves to obtain high volumetric efficiency in combination with physical compactness. The supercharging effect is obtained, if desired, by making the displacement of the pumps larger than the displacement of the power cylinder. The exhaust ports must possess a suitable flow resistance. Otherwise, power cylinder pressures higher than ambient cannot be achieved regardless of the ratio of the displacements. For this reason the exhaust ports cannot be made arbitrarily large.

The scavenge air of the engine of the present invention is introduced into the power cylinder through transfer ports located in the center of the heads. By this method the scavenging flow traverses one-half to one-third the distance traversed by flows in loop, or reversed loop, scavenged engines. Scavenging efficiency is inversely proportional to piston speed since time becomes unavailable for the scavenge flow to circulate through a long looping path. The small distance the present scavenge flow travels is highly desirable because relatively efficient sweeping of the power cylinder occurs at high piston speeds.

The engine of the present invention possesses an aftercooler employed in combination with supercharging. The heating of the intake air due to its compression by supercharging lowers the engine power output; unless the diesel cycle is employed. The aftercooler can produce final temperatures of the fresh air charge within the power cylinder below ambient. The air temperature obtained depends upon the aftercooler's thermodynamic sizing.

Aftercoolers of ordinary design have significant difficulty producing final air temperatures near ambient except in marine applications where cool water is readily available.

A single exhaust header services both exhaust blowdowns of the double-acting engine, and forms a gas flow pattern that strongly aids in silencing the exhaust note by damping the sudden blowdown surges. Additionally, the flow pattern destroys, or does not accommodate, the formation of traveling pressure waves within the exhaust system which causes performance loss due to pressure fluctuation at the exhaust ports.

The exhaust ports are controlled by the power piston. Although the engine of the present invention can be carbureted, the use of direct fuel injection is highly preferred. Upon closure of the exhaust ports by the power piston, during the early portion of its compression stroke, fuel is injected into the power cylinder. By this means fresh fuel is prevented from leaking into the exhaust system. The scavenging pumps supply only fresh air to the power cylinder when working with direct fuel injection.

In ordinary two-stroke designs the fresh fuel-air mixture is used for scavenging. The residual spent gas comes in contact with the fresh mixture as the same is used to sweep out the power cylinder. Investigators have strongly suggested the contact of highly reactive free radicals in the spent gas with the fresh combustible mixture to be the source of pre-ignition. This chemical reaction is discussed by M. Noguchu in SAE Paper 790740. The engine of the present invention scavenges with a sonic blast of cool air before any fuel is injected. By this means the spent gas is mostly removed and cooled before mixture formation occurs, thereby minimizing the creation of a chemical instability that leads to pre-ignition.

The engine described herein is cylindrical in shape and when installed horizontally is compatible with low hood line coachwork.

LIST OF FIGURES

Figure 15:
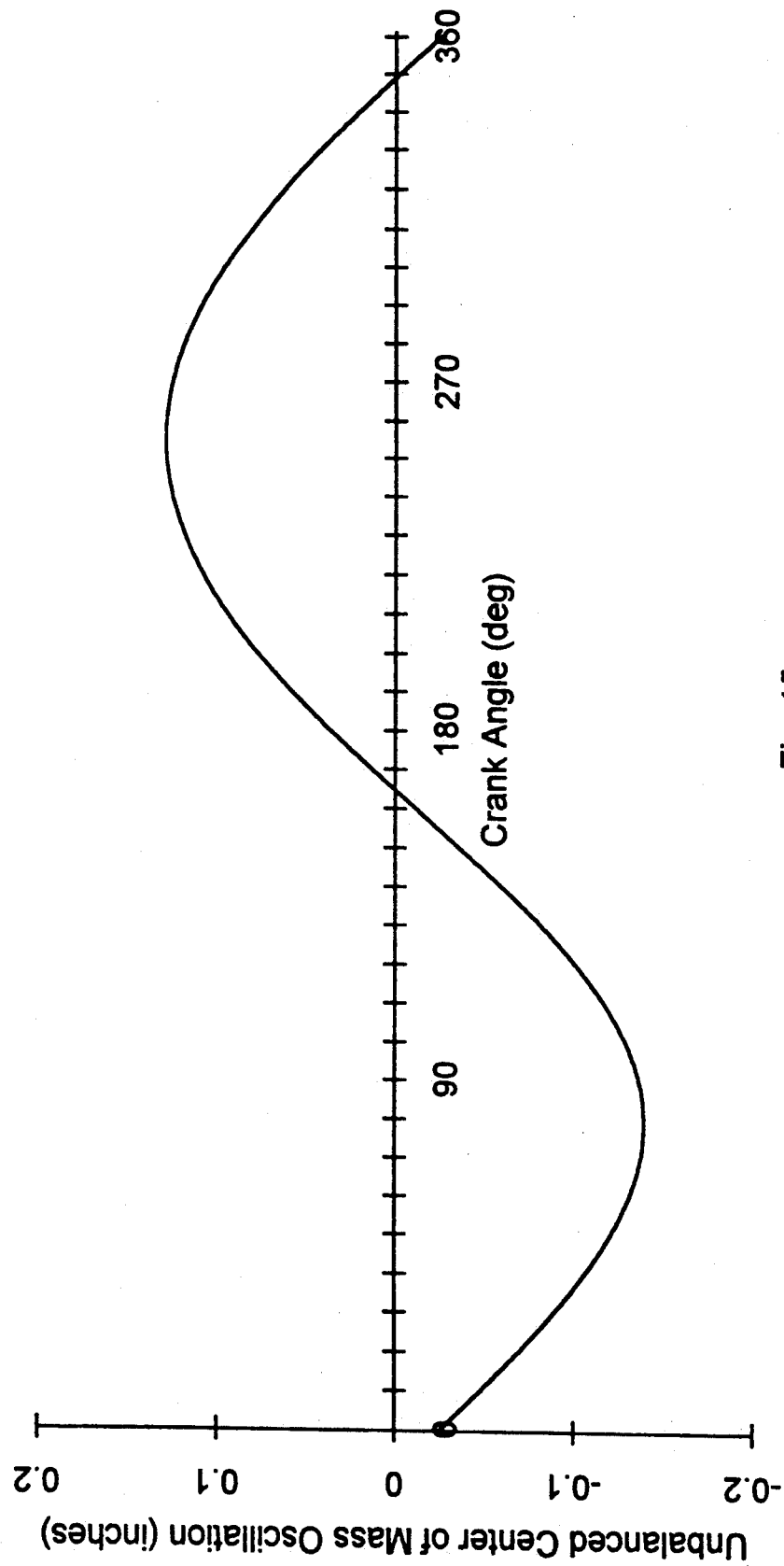
Figure 16:
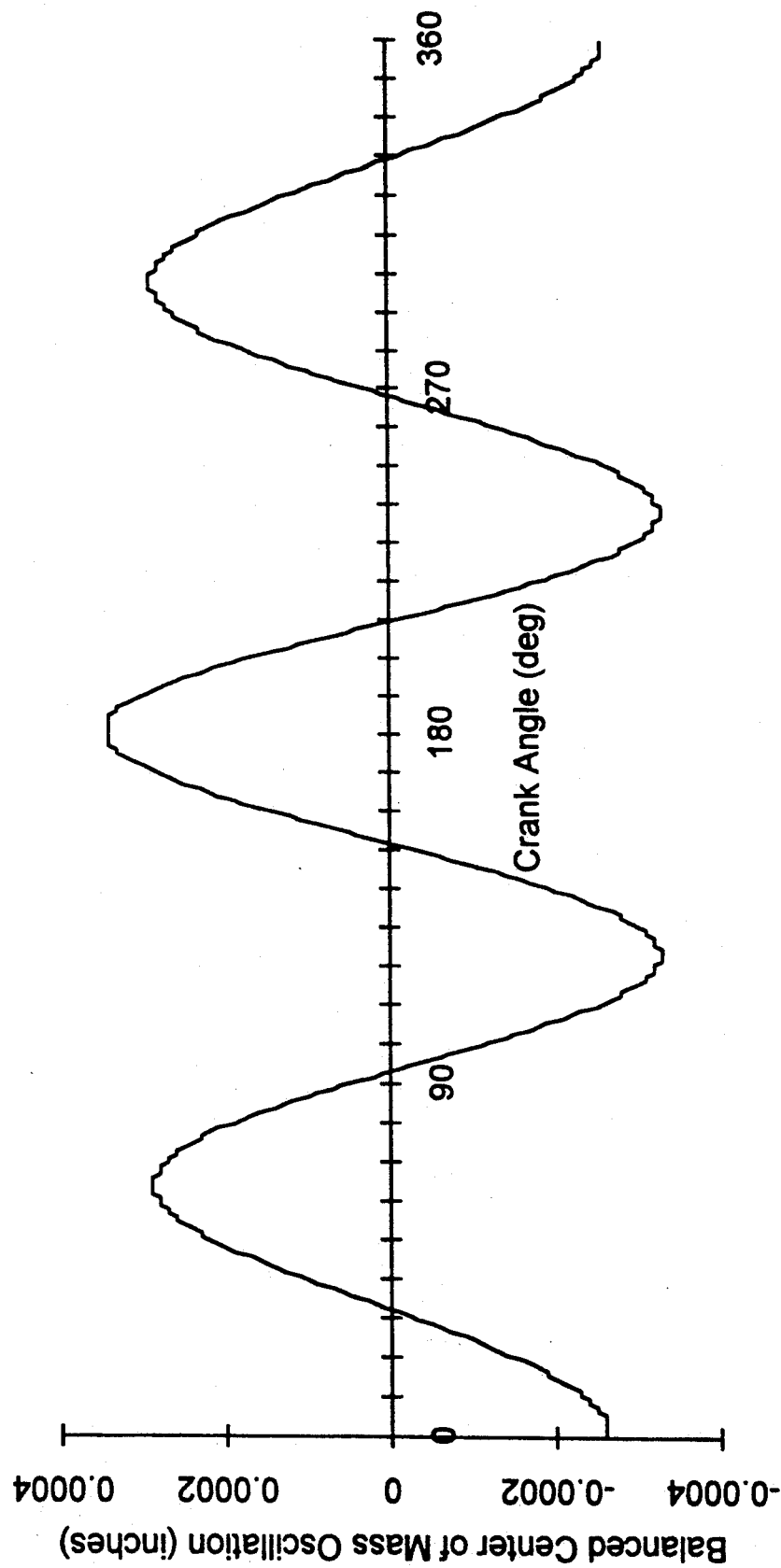

FIG. 14A, B, and C is the computer source code to obtain mechanical balance;

FIG. 15 is a plot of unbalanced engine vibration;

FIG. 16 is a plot of balanced engine vibration; and

FIG. 17 shows the installation of the counterbalance weights according to the example.

PREFERRED EMBODIMENT OF THE INVENTION

General Structure of the Engine

Figure 1:
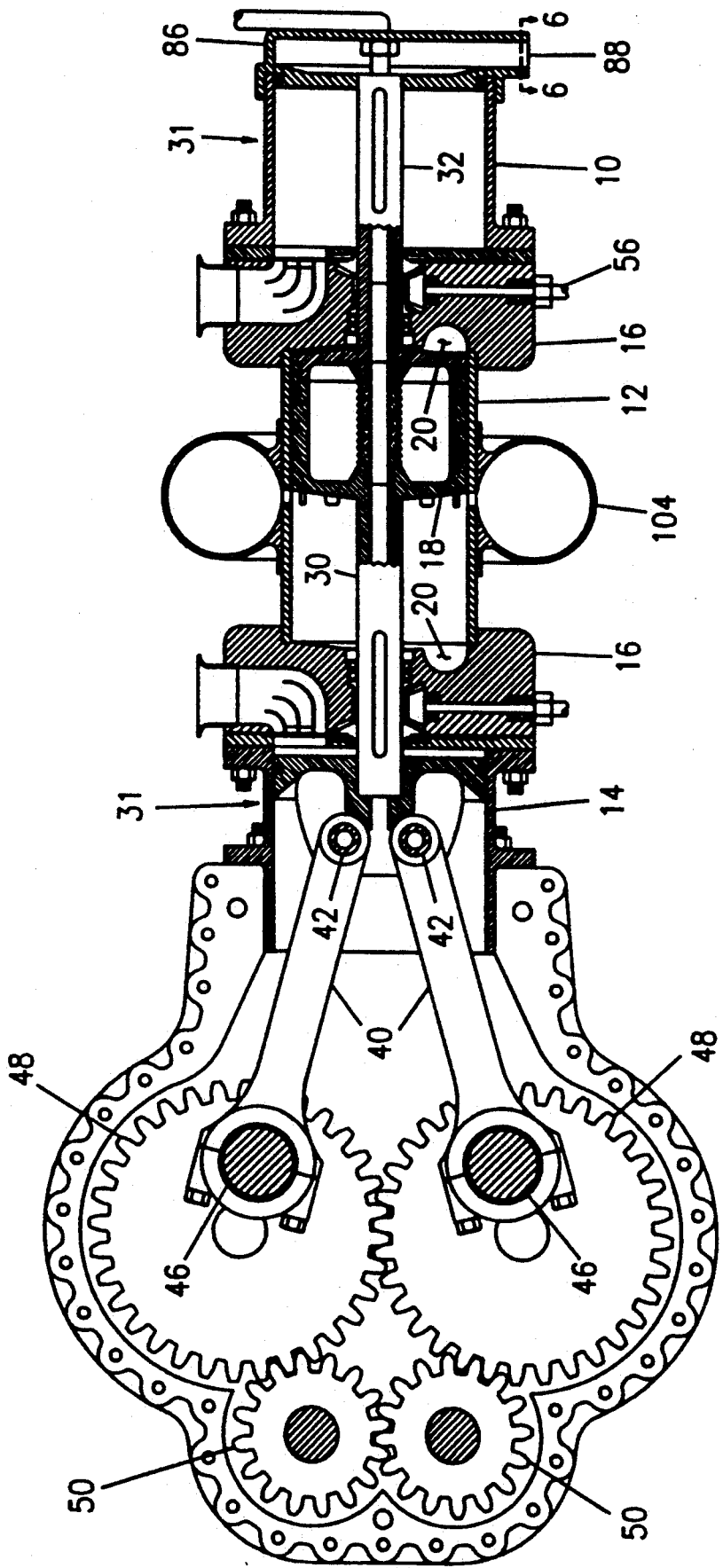
FIG. 1 is a cross-sectional front view of the engine.

Referring to FIG. 1 of the drawings, the engine possesses three axially aligned aluminum cylinders 10, 12 and 14. Cylinder 12 is the power cylinder, closed by opposing identical aluminum heads 16 and in which a double crowned power piston 18 reciprocates, driven by the alternating deflagrations within the separate combustion chambers 20. It is to be understood that the combustion events are 180 crankshaft degrees apart in each end of the engine and therefore duplicate parts are labeled with identical numerals in the drawings.

Figure 2:
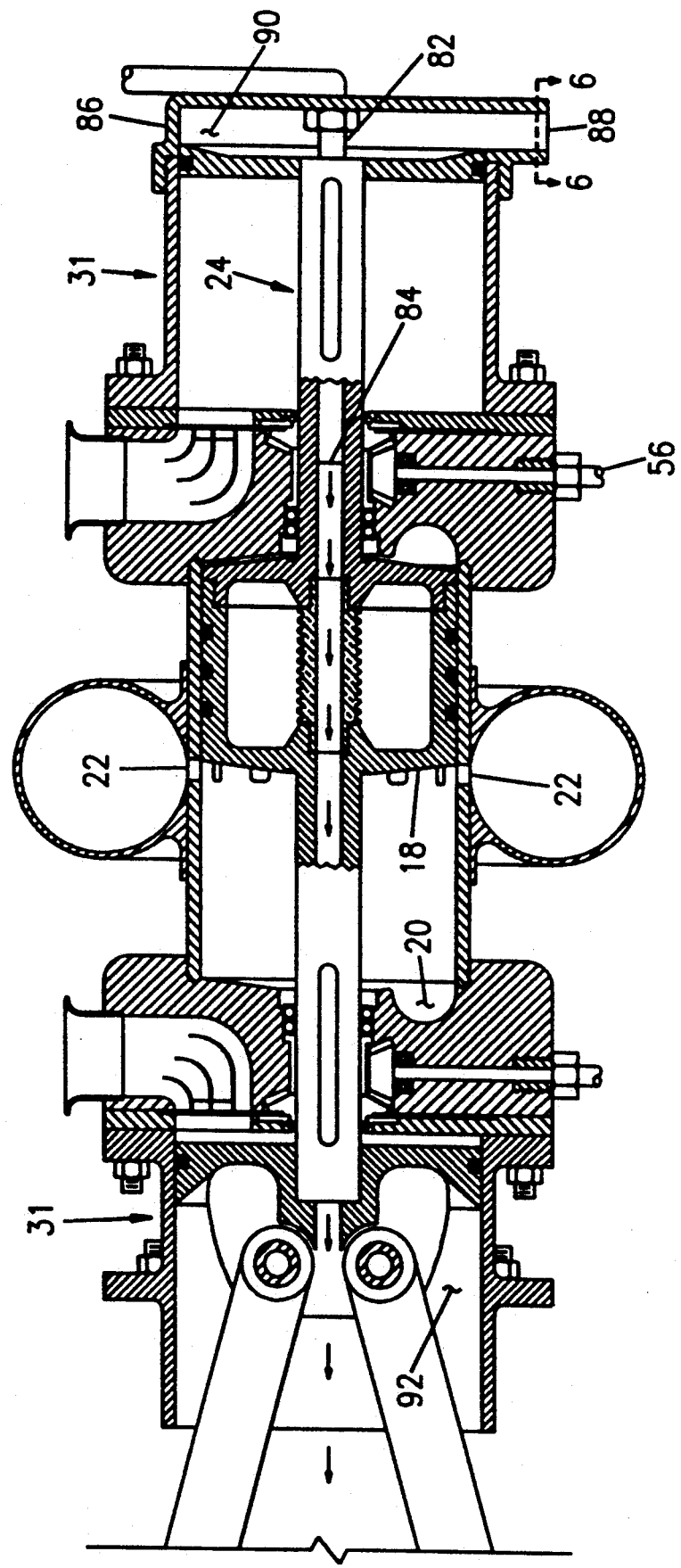
FIG. 2 is the engine at first dead-center, detached from the crankcase.
Figure 3:
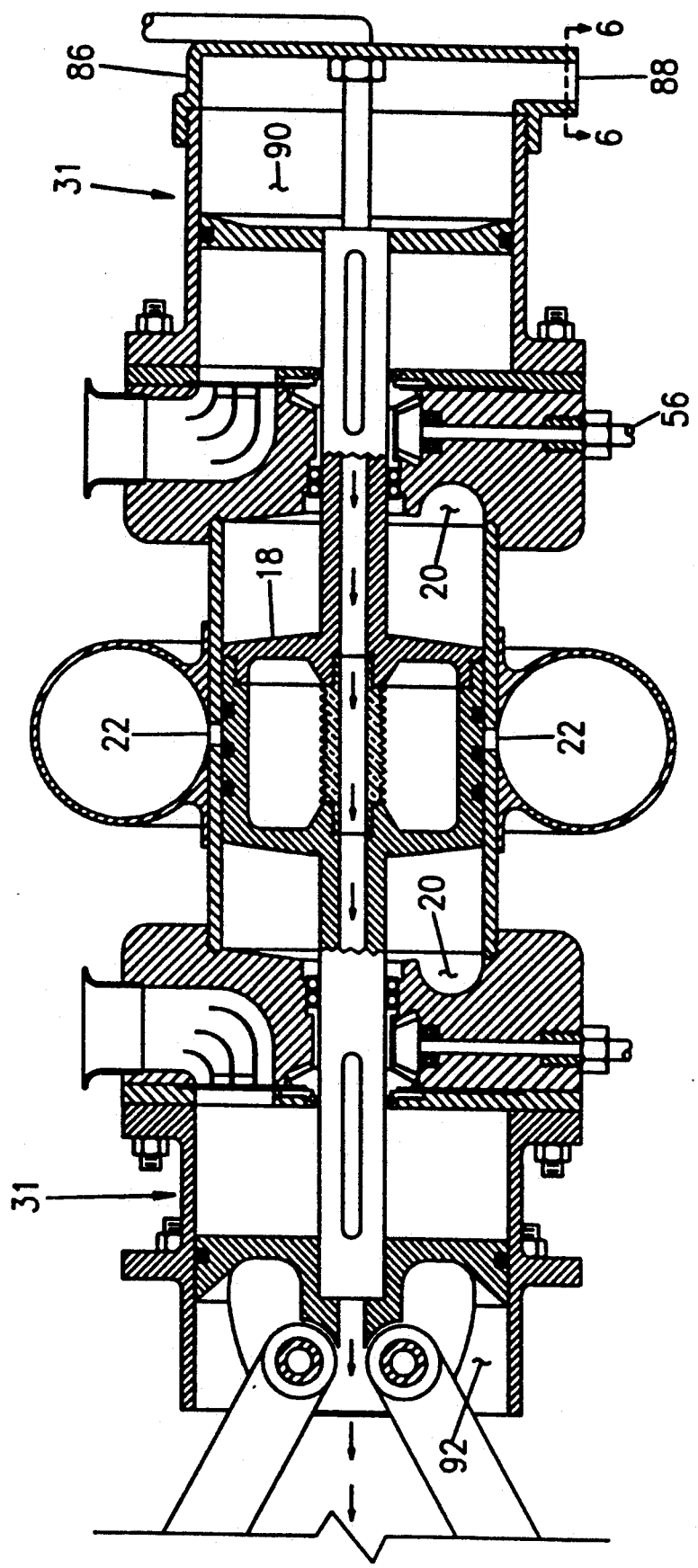
FIG. 3 is the engine at mid-stroke, detached from the crankcase.
Figure 4:
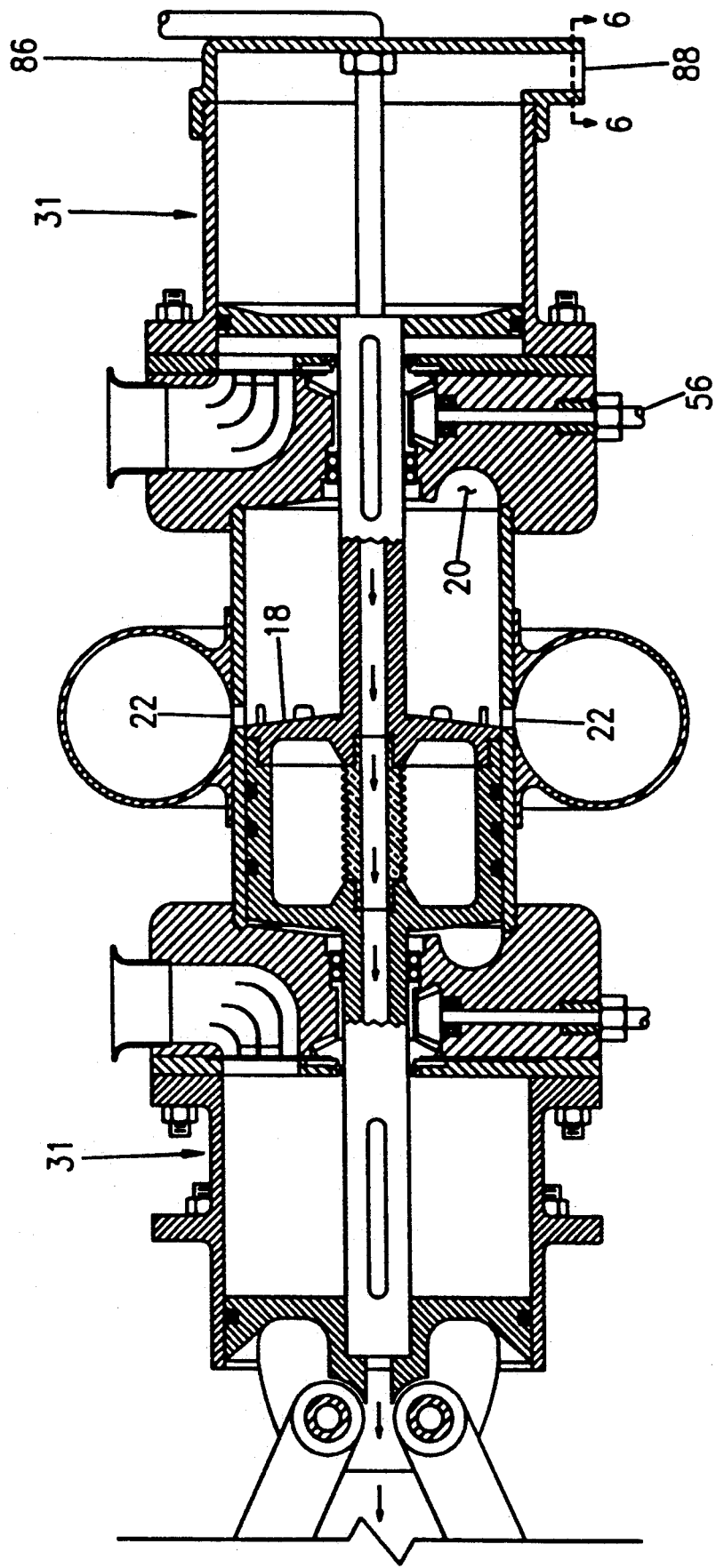
FIG. 4 is the engine at second dead-center, detached from the crankcase.

Examination of FIG. 2, FIG. 3, and FIG. 4 gives a clear understanding of the reciprocation of the power piston 18. FIG. 2 shows the power piston 18 moved to the first "dead-center" position, thereby fully opening equatorial exhaust ports 22. FIG. 3 shows the power piston 18 moved to the mid-stroke position. FIG. 4 shows the power piston 18 moved to the second dead-center position, thereby again fully opening exhaust ports 22.

The three aluminum cylinder bores are coated with Nikasil (R), a nickel/silicon carbide composite surface finish, available from Mahle Cylinders of Bridgeport, Conn. This surface finish is very highly preferred for its oil retaining properties in combination with wear resistance. Importantly, Nikasil (R) possesses a total absence of delamination around exhaust ports because of its excellent adherence to the aluminum substrate.

Figure 5:
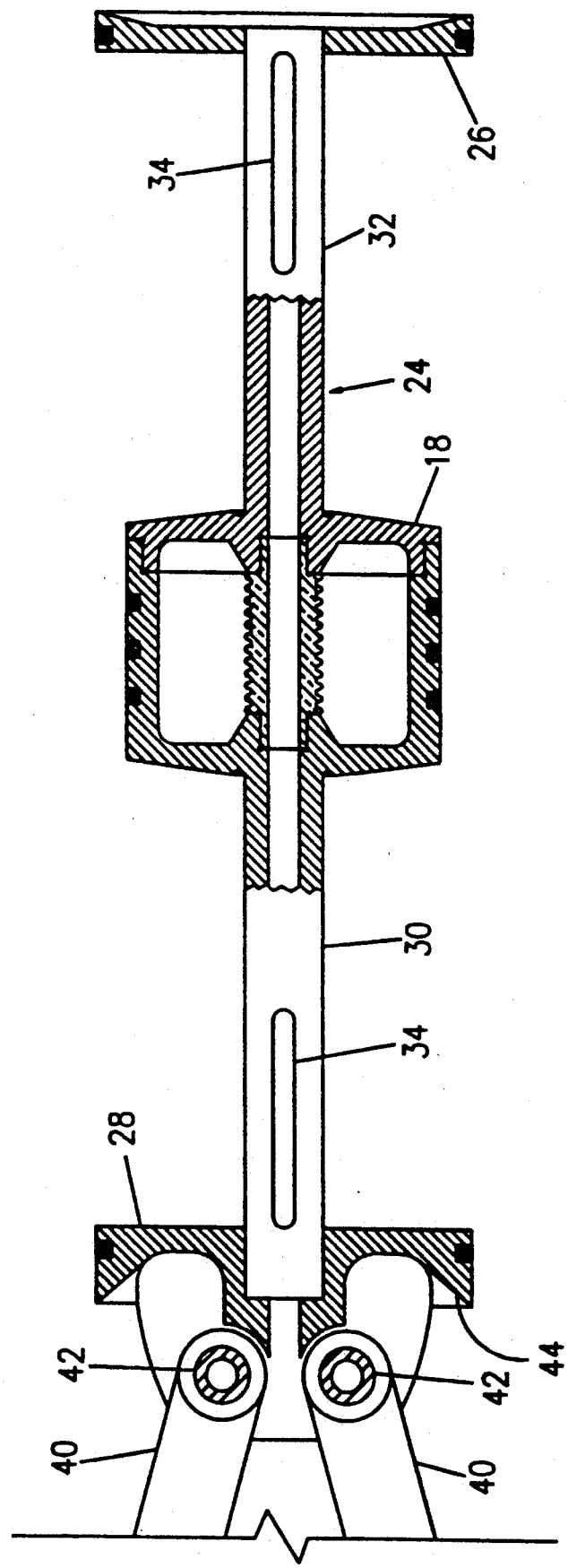
FIG. 5 shows the piston assembly in a partial cross-sectional view.

Referring to FIG. 5, the piston assembly 24 can be understood. Three pistons; the power piston 18, a first scavenging piston 26, and a second scavenging piston 28, are shown spaced apart and fast upon the hollow rods 30 and 32. The rods 30 and 32 are guided by glands 68 which are discussed in the paragraphs titled, "Glands for the Reciprocating Rods." Pistons 26 and 28, in combination with their respective cylinders, form scavenger pumps 31. The rods 30 and 32 possess gas transfer ports 34 consisting of a plurality of U-section flutelike slots adjacent to scavenging pistons 26 and 28. Transfer ports 34 provide the phase synchronized communication of the scavenger pumps with the power cylinder 12.

Figure 7:
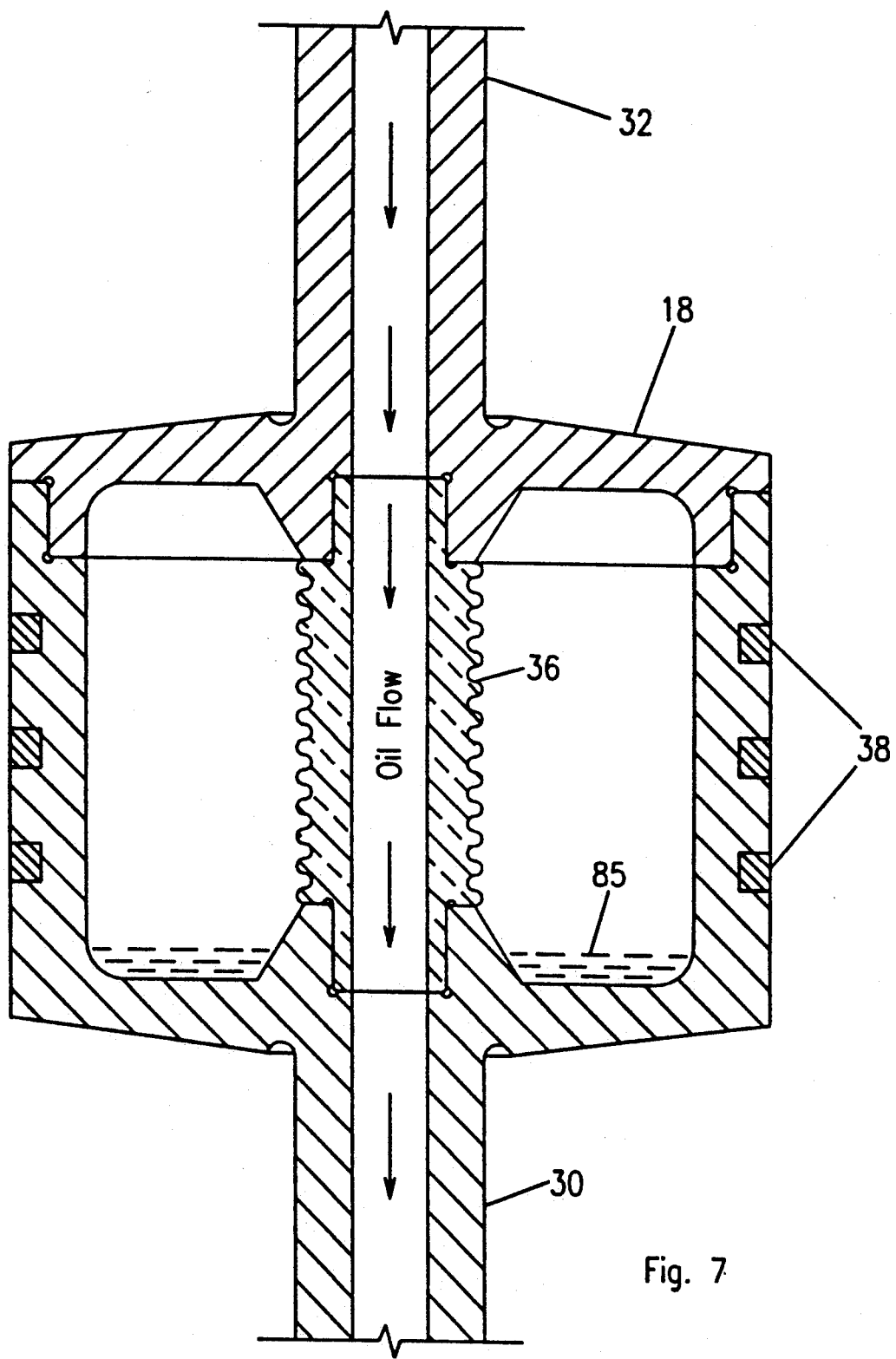
FIG. 7 shows a cross-section of the power piston.

Referring to FIG. 7, a preferred construction of the power piston can be understood. Power piston 18 makes up from stepped halves that fasten by bolts (not shown) threading into the skirt. Rods 30 and 32 are assembled into piston 18 by threading onto hollow nipple 36. In some designs the welding, or diffusion bonding, of rods 30 and 32 to the power piston crowns is preferred. The power piston must be absolutely leak proof, and throrough sealing is obtained, during assembly, by the application of a thin bead of Copaltite (R), manufactured by the National Engineering Products Company, of Washington, DC.

The ring band 38 of the power piston consists of three rings. The rings pull heat from the wall of the power cylinder and transfers it to the coil power piston. For this reason rings are very much preferred to have a large contact area. The rings must be "pinned" so the ring gaps cannot rotate and enter the exhaust ports. The pinning of rings in two-stroke cycle engines is commonly practiced in the art.

Reciprocating rod 30 is a stressed part and care must be taken in its design and fabrication. However, rod 32 and scavenging piston 26 do not operate under equally severe duty, and they are fabricated from a high-strength aluminum alloy.

The second scavenging piston 28 is a stressed part. It ties rod 30 to the twin connecting-rods 40, as shown in FIG. 1. Care must be exercised in its design to avoid any stress raisers. Piston 28 possesses twin piston pins 42. Knife edge scallops 44, shown in FIG. 5, shear the crankcase oil residing upon the wall of cylinder 14 and sprays the same upon the rod ends as piston 28 descends in its cylinder.

The use of Aero-threads are very highly preferred throughout these stressed assemblies.

If an exceedingly high-performance engine is contemplated, power cylinder 12, power piston 18, rod 30, and scavenging piston 28 are fabricated of continuous silicon carbide fiber reinforced aluminum which obtains tensile strengths of 106 tons per square inch and compressive strengths of 200 tons per square inch. Textron Specialty Materials of Lowell, Mass. can fabricate the aforementioned piston assembly 24. The use of continuous silicon carbide metal matrix composites obtains the mass of aluminum combined with the mechanical properties of high-grade steel.

If a moderately stressed engine is contemplated, a high-strength aluminum, such as 7075-T6 which obtains tensile strengths of 39 tons per square inch, can be substituted for the metal matrix composite. This alloy must be protected from the oxidizing products of combustion by a suitable coating.

Pistons 26 and 28 are fitted with bronze, step cut, air compressor piston rings. Suitable rings are available from Superior Piston Ring Co., of Detroit, Mich.

Twin connecting-rods 40 attach to piston 28 via piston pins 42, as cited above. The connecting-rods attach to twin crankpins 46 resident in the four meshed crankpin gears 48 as shown in FIG. 1. The pitch circles of meshed gears 48 are tangent to the axis of reciprocation of piston assembly 24. Very highly preferred connecting-rods, under the designation "Forging C," are available from Carrillo Industries of San Clemente, Calif. By this means the phase synchronized crankpins allow the engine of the present invention to present mirror symmetry about the piston assembly's direction of motion.

Twin idler gears 50 engage crankpin gears 48 as shown in FIG. 1. Idler gears 50 are sized to rotate at exactly twice the rotational frequency of the engine. Gears 50 serve as "power take offs" to drive the rotary disc valves to control air intake for scavenging pumps 31 and also to obtain mechanical balance. We prefer to position the idler gears at the base of the crankpin gears so they may run on axles without interfering with the connecting rods.

Referring to FIG. 1; the four meshed crankpin gears 48 also serve as flywheels which reduce the fluctuation in engine speed arising from the natural variation in crank effort. Best results are obtained with the flywheel moment sized to remove variation in the lowest speed of interest. We very highly prefer "herringbone" teeth for each crankpin and each idler gear in order to remove vibration, noise, and all axle side thrust. The use of herringbone teeth upon all the gears removes the possibility of any bending moment occurring at the crankpin. The gears are deliberately shown with ordinary teeth for simplicity of illustration. Importantly, small streams of oil must be directed upon each set of meshed teeth, including the idlers, to secure satisfactory results.

We highly prefer to fabricate both crankpin gears and their crankpin from a single solid steel billet to obtain a monolithic crankshaft structure. The many advantages of "single piece" designs in such applications are well known in the structural engineering arts.

The engine will generally be mounted lengthwise and possess a so-called "dry sump" lubrication system. The engine bearings are force lubricated by an oil pump (not shown) in combination with a filtration system.

The Rotary Disc Valves

Figure 8:
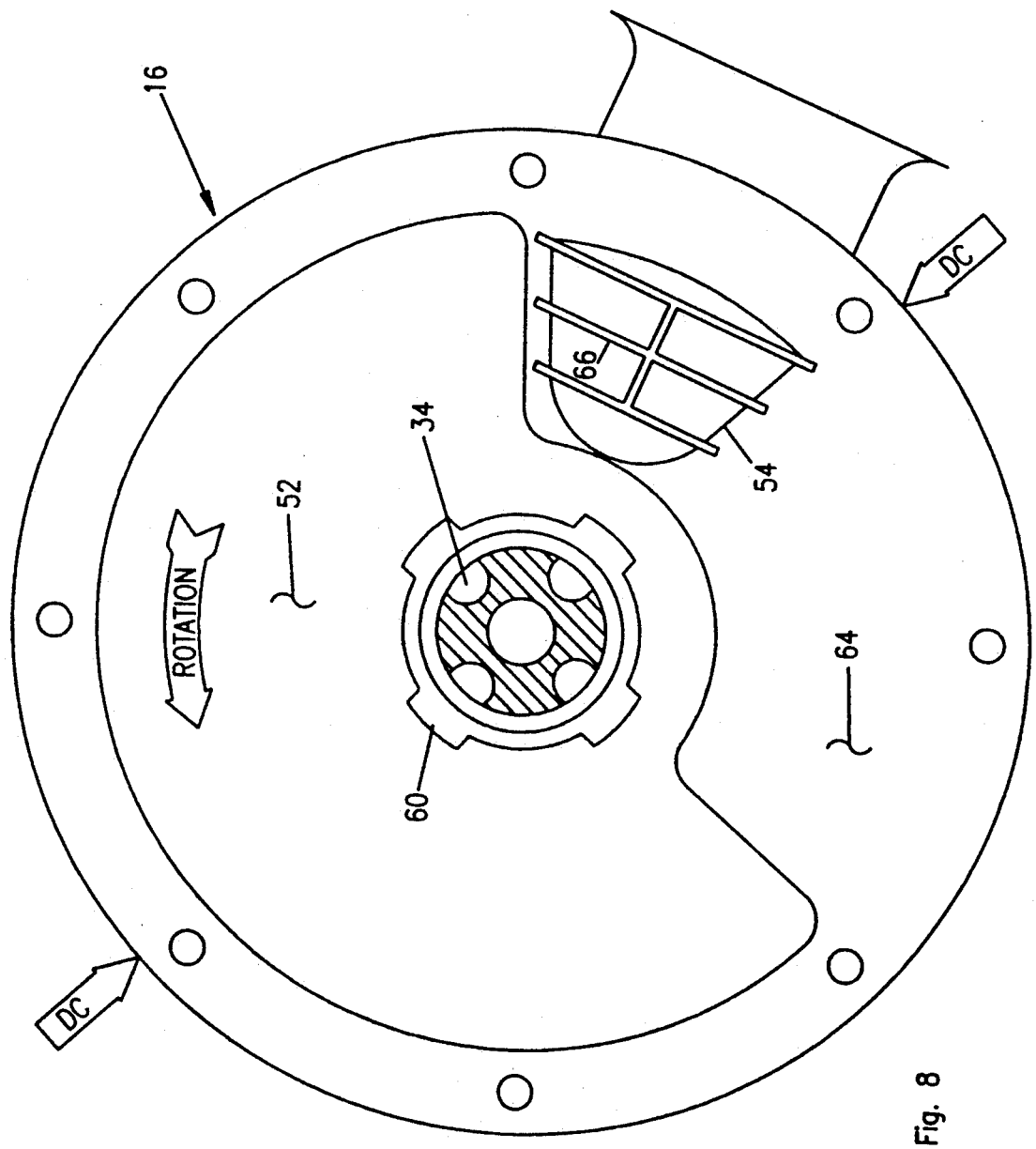
FIG. 8 is a plan view of a head with the rotary disc valve.
Figure 9:
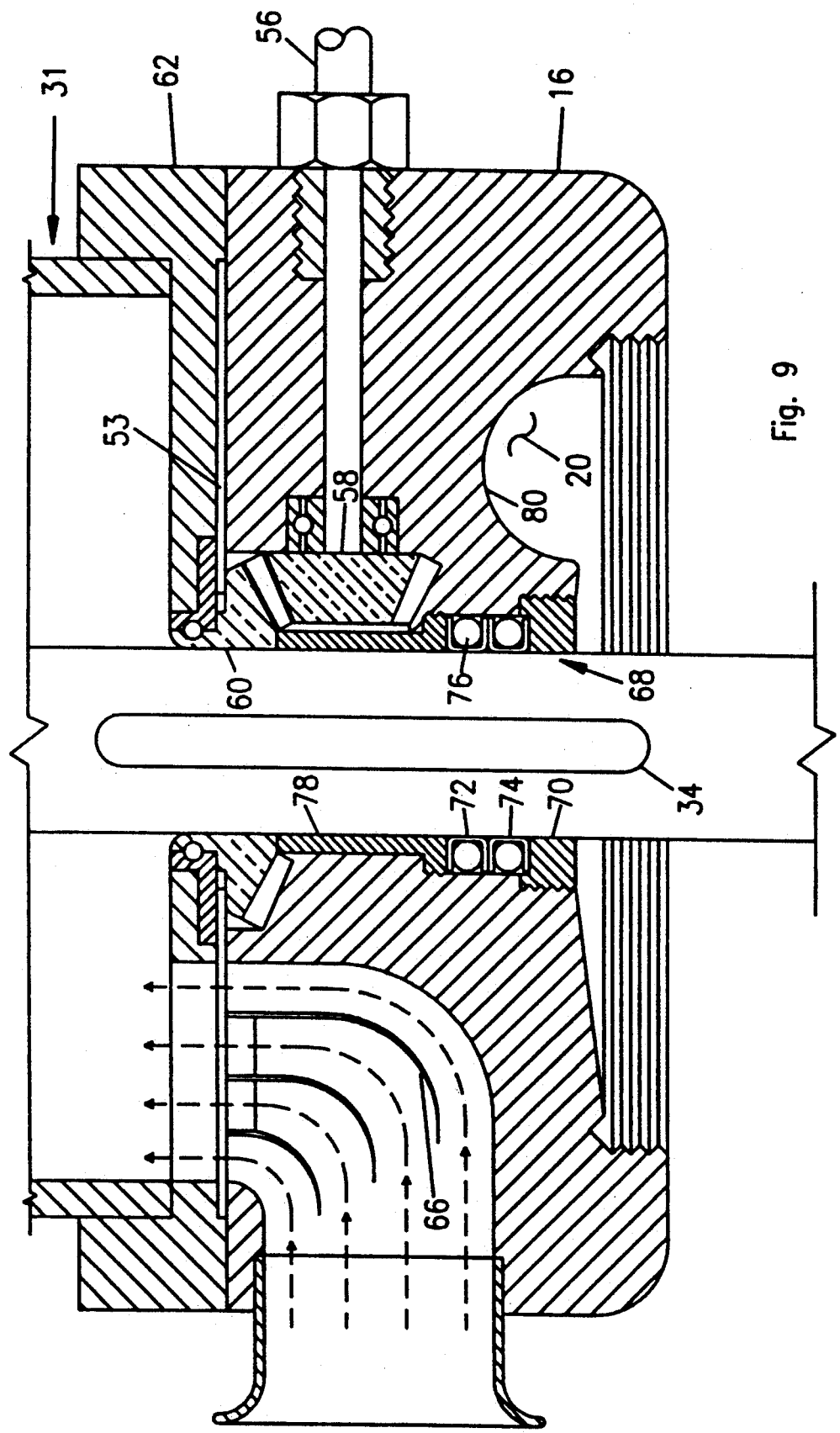
FIG. 9 is a cross-section of a head of the engine.

The atmospheric air intake of scavenging pumps 31 is controlled by rotary disc valves. The rotary disc valve obtains an unrestricted path for air flow into the scavenging pumps during their intake cycle, thereby obtaining a high filling efficiency. FIG. 8 shows a plan view of head 16 with rotary disc valve 52 installed and controlling air intake port 54. FIG. 9 shows head 16 in cross-section and reveals a side view of rotary disc valve position and drive arrangement.

The disc valves rotate at the frequency of the engine. The disc valves 52 are driven by oftencalled "flex-shafts," which are available from Stow (R) Manufacturing Co., of Binghamton, N.Y. The Stow flexible shafts are highly preferred for their ruggedness and aerospace rating. The flex-shafts 56 attach to idler gears 50, and so rotate at twice engine frequency. This twice engine frequency of rotation allows bevel gear 58 to be small in diameter, thereby conserving space within the engine heads. Bevel gear 60 drives rotary valve 52, at engine frequency as driven bevel gear 60 is sized twice the diameter of bevel gear 58. By this means the rotary disc valves rotate at engine frequency, and open and close intake port 54 in phase synchronism with the reciprocating motion of scavenging pistons 26 and 28. It must be borne in mind that the use of cheap flex-shafts that do not possess suitable torsional stiffness will give rise to unwanted variations in port timing.

Figure 10:
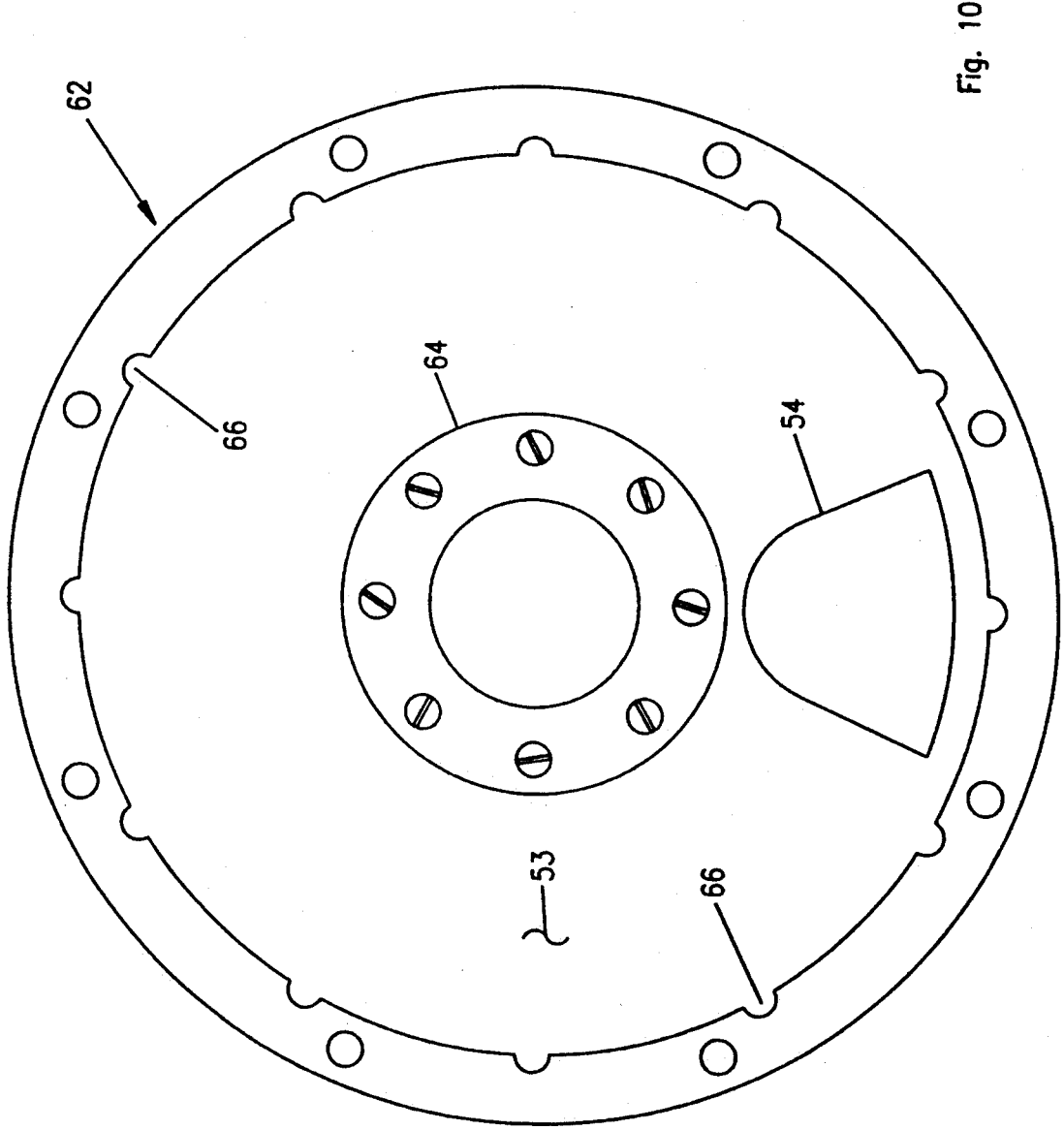
FIG. 10 is a plan view of the underside of a scavenger pump floorplate.

The disc valves 52 are made from a 0.025 inch hardened stainless steel. The disk is a loose slip fit on splined boss of steel bevel gear 60. Each disc valve is sandwiched in a 0.045 inch gap, labeled 53 in FIG. 9, milled in the underside of aluminum floorplate 62 of scavenging pumps 31, and between the flat aluminum head surface 64 as shown in FIG. 8. FIG. 10 shows the milled gap 53 in the underside of floorplate 62 containing the bearing race 64 for bevel gear 60 and scallop debris catchers 66.

The control of the intake of fresh air into the scavenging pumps may be understood by reading the following text, while referring to FIG. 1 and FIG. 8. The disc valve 52 is mutilated to open intake port 54 for approximately 132 degrees of crankshaft rotation, thereby allowing the scavenging pump to inhale air through port 54. FIG. 8 denotes the dead-center positions of the engine with arrows labeled with the upper case characters, DC. The dead-center points of the double acting engine are 180 crankshaft degrees apart. The direction of rotation of disc valve 52 is shown by the curved arrow labeled ROTATION. When scavenging piston 26 or 28 leaves its bottom dead-center, the disc begins opening port 54 and the intake of air begins. The air flow is represented by dotted arrows shown in FIG. 9. The port remains fully open for a substantial portion of the 132 degrees, and then begins to close as the scavenging piston approaches its top dead-center. When the scavenging piston obtains its top dead-center position, the scavenging pump is filled and port 54 is fully closed.

The scavenging piston compresses its air as it passes through its top dead-center and moves toward floorplate 62. Disc 52 continues to rotate, but is forced against head surface 64 by the rapidly rising air pressure within the cylinder, thereby thoroughly sealing intake port 54.

The action of the rotary disc valve is a combination of the behaviors of the vibrating reed valve and the gate valve; it flutters and "blanks off" during operation. The disc rotates in its 0.045 inch wide gap, and is free to center itself during rotation because of the previously cited slip fit on the splined boss. The port timing may be adjusted to account for the inertia of the high-speed air flows by installing the disc upon the splined boss to open earlier or later. Also discs with more than 132 degrees of mutilation provide an additional degree of freedom in adjusting the port timing.

Referring to FIG. 8 and FIG. 9; intake port 54 possesses guide vanes 66 which strongly reduce the flow resistance into the scavenging pump. The use of guide vanes in high-performance elbows is well known in the art. Importantly, the vanes also serve as mechanical support for the thin rotary disc when it spans and seals the large port area.

It is well known that there are molecularly bonded anti-friction coatings available to treat the rotary disc valve system to obtain a virtually wear free device. Such useful surface treatments are available from General Magnaplate Corporation of Linden, N.J.

Scavenging the Power Cylinder

The power cylinder 12 receives a sonic blast of scavenge air after the power piston controlled exhaust ports 22 are slightly open. By this method the exhaust gas blowdown has been in progress and the exhaust gas pressure and temperature within the power cylinder has substantially fallen. The gas transfer ports 34, as shown on FIG. 5 and FIG. 9 mentioned earlier in the paragraphs under "General Structure of the Engine," egress from glands 68. By this means a charge of air is released from the scavenging pump into the power cylinder. The fresh air continues to flow until the power piston passes on through its bottom dead-center point and eventually retracts gas ports 34 in glands 68. Under certain operating conditions it is advantageous to modify the transfer port timing, as previously described, and open the transfer ports before the exhaust ports begin to open.

For the engine geometry shown in this disclosure the scavenger air is compressed well above critical pressure before its release into the power cylinder.

At the end of the scavenging portion of the cycle, fresh air is resident within the power cylinder and the remaining combustion products are substantially cooled and chemically deactivated.

Glands for the Reciprocating Rods

FIG. 9 contains a cross-sectional view of the construction of the reciprocating rod glands 68. The glands 68 perform reciprocating rod alignment and gas sealing functions.

The fabrication materials of reciprocating rods 30 and 32 are discussed in the paragraphs entitled "General Structure of the Engine." Rods 30 and 32 are ground to uniform dimension and electrodeposited with Nikasil (R).

The glands 68 used for rods 30 and 32 are multi-element assemblies as shown in FIG. 9. The primary guide 70 is a threaded aluminum-bronze bushing, possessing a length to diameter ratio of 0.25, and sized as a class 3 fit upon rods 30 and 32 at operating temperature.

A gas seal is formed from a pair of radially split Type 440C, full hard, stainless steel split bushings 72 and 74 that closely encircle the outside diameter of their reciprocating rod at operating temperature. The split bushings are loosely pinned at their abutting faces so they cannot rotate and align their radial splits thereby creating paths for gas leakage. Bushings 72 and 74 are coated with Titanium Nitride (TiN) which is highly preferred for its high wear resistance and very low affinity for metals. The split bushings are energized about rods 30 and 32 by elastomeric O-rings 76. O-rings 76 are preferred to be of Kalrez (R), manufactured by the DuPont company. The use of O-rings 76 not only energizes the bushings about rods 30 and 32, but serve to damp out any "chatter" that might arise if inelastic materials were exclusively employed. It is not necessary, or desirable, to exert pressures greater than several pounds per square inch about rods 30 and 32 with the split bushings.

The secondary guide 78 is a solid bushing also formed from aluminum-bronze, and is a class 3 fit upon rod 30 or 32 at operating temperature. Secondary guide 78 also serves as a bearing seat for bevel gear 60.

The split bushings inset with both primary guide 70 and secondary guide 78 with a small radial clearance. The insetting limits the radial expansion of the split bushings when they are acted upon by the pressure of the air blast through gas ports 34 during scavenging.

Both the primary guide 70 and secondary guide 78 are screwed into the aluminum heads using a very sparse amount of Copaltite (R).

It is important to note that the cooling of glands 68 is obtained from multiple sources including the powerful fresh air blast during scavenging of the power cylinder. Small amounts of lubrication oil in the form of airborne mist arrive within the glands due to the imperfect sealing of the scavenger pump rings. This airborne oil mist is also used to lubricate the power piston and its cylinder.

Best results in alignment of the engine are obtained when all cylinders are align-bored using the glands to locate the boring bar.

Combustible Mixture Formation

Upon complete closure of the exhaust ports by the power piston, fuel is injected into the power cylinder by an electronic fuel injector (not shown). The fuel is injected early in the compression stroke so that circulation, vaporization, and squish can fully operate to produce a homogeneous mixture in the combustion chambers 20 as shown in FIG. 1.

A highly suitable computer controlled electronic fuel injection system for two-stroke cycle alcohol, gasoline, diesel, or natural gas engines, with programmable injection characteristics and pressures to 3,000 psi, is available from Servojet Products International of San Diego, Calif. A detailed description and evaluation of the Servojet system is published in SAE Paper 861242 titled "Electronic Fuel Injection for Two-Stroke Cycle Gasoline Engine."

Spark Ignition of the Mixture

The combustion chamber walls 80, of the engine of the present invention, are hemispherical in radial cross-section as shown in FIG. 9. The combustion chambers are hollow semicircles in the azimuthal plane of the head. The clearance volume of the combustion chambers, and hence the compression ratio of the engine, is governed by the choice of length of the semicircular arc. Best results are obtained with the combustion chamber oriented in the head so that spark plugs obtain easy access to the chamber without interfering with other head components such as the rotary disc drive mechanisms. Additionally, as a variety of power cylinder bore diameters with differing compression ratios are contemplated; the combustion chambers may be symmetrically fitted with more than one spark plug. For example, a long semicircular combustion chamber may produce best running with simultaneously fired spark plugs installed at each end of the chamber.

Cooling System

The engine heat is removed by forcing a portion of the lubricating oil through the piston assembly 24 as shown by arrows in FIG. 2. The object of the cooling system is to hold the temperature of the piston crown below 400 degrees F. and cylinder wall below 290 degrees F. with the engine under full load. The cooling oil is initially withdrawn from the crankcase sump via positive displacement gear pump (not shown) and fed through a full flow filter to an oil to air radiator (not shown). The pump is equipped with a pressure relief valve to obtain an oil flow rate that is independent of engine speed. The radiator (not shown) possesses a ducted electric fan that operates in combination with a thermoswitch to draw the required air flow when there is no air stream due to the motion of the vehicle. A suitable radiator is available from Limco Manufacturing Corporation of Glen Cove, N.J. under the designation Model 6501. The cooled oil is then fed into the piston assembly 24 by the interpenetrating copper alloy tube 82. The end 84 of tube 82 is shown in FIG. 2. In practice, the wall thickness of tube 82 is thin as practical to obtain a rectilinear flow to avoid hydraulic shock and maintain mechanical balance. Best results are obtained when tube 82 has a large thermal conductivity. The exterior of tube 82 is treated with Hi-T-Lube (R), an anti-friction coating available from General Magnaplate.

The interior of power piston 18 is hollow and makes up from bolted stepped halves as discussed in the preceding section titled "General Structure of the Engine." The cooling oil stream passing through the reciprocating piston assembly must flow without bends or changes in crosssectional flow area or the mechanical balance of the engine will be seriously disturbed.

The thermal conductivity of high-strength aluminum alloys are relatively low, and under certain engine operating conditions may not adequately conduct heat to the oil cooled piston center. If the heat load of the power piston is large, due to high compression ratios, or high compression pressures arising from supercharging, or if the piston skirt and ring band require more cooling, the heat extraction can be greatly increased by the following method.

Referring to FIG. 7; the nipple 36 that joins rod 30 and 32 is fabricated from a zirconium-copper alloy whose exterior surface is fined to increase its area. The Zr-Cu alloy possesses a thermal conductivity near pure copper and also obtains a yield strength of 31 tons per square inch. The hollow interior of the power piston is provided with a small amount of "closed-loop" heat transfer fluid, such as Paratherm NF (R) available from Paratherm Corporation of Conshocken, Pa. The fluid 85 must be inert, possess a very low vapor pressure at elevated temperatures, and not form deposits. The reciprocation of the piston violently impacts the fluid and forms a migrating mist between the warm piston surfaces and the cool copper nipple. By this means the overall heat transport is increased, and the cooling of the piston skirt is highly enhanced. The skirt with its ring band is chiefly responsible for cooling the power cylinder bore, and for this reason careful attention must be given to skirt cooling. In an exceedingly high-performance engine silicon carbide fiber reinforced copper from Textron Speciality Materials can be used for nipple 36, thereby obtaining the thermal properties of copper combined with the strength of steel.

The heat transfer efficiency of the cooling oil in piston assembly 24 will be large partly because of the "scrubbing" action of the cooling oil on the metallic surfaces arising from the rapid reciprocation of the piston assembly 24. The resulting flow field of the oil will be the superposition of the pump driven steady flow, and an oscillatory flow of very small displacement whose frequency is governed by the operating frequency of the engine. The heat transfer efficiency is also high because the cooling oil is applied very near the seat of the heat; realizing that the only intervening thermal impedance is the thickness of the piston's aluminum walls.

Figure 6:
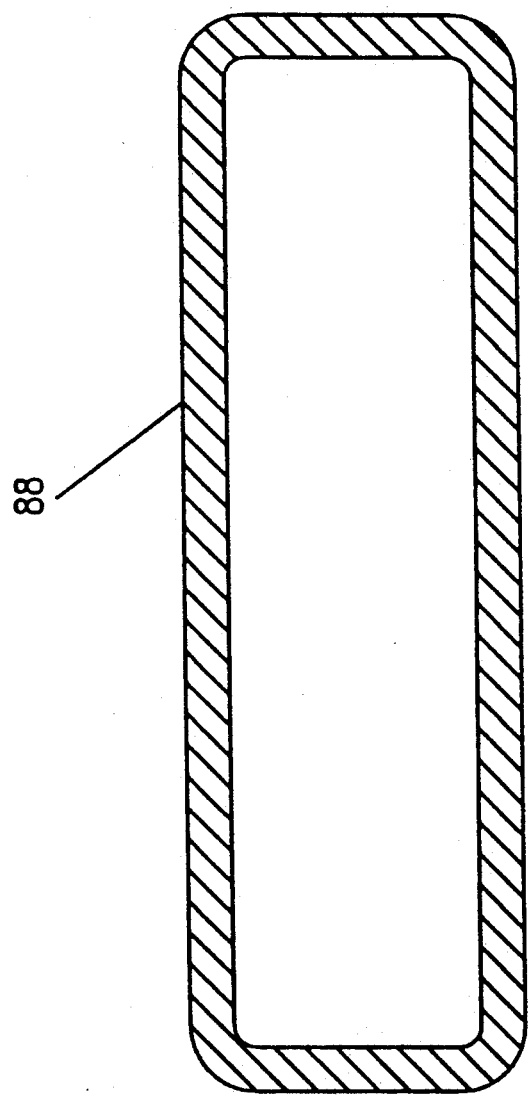
FIG. 6 shows a cross-sectional view of the spigot.

FIG. 1 through FIG. 4 show a leak proof cap 86, upon which tube 82 is rigidly mounted, with a spigot 88 of large flow area. FIG. 6 shows a cross-sectional view of spigot 88. A breathing pipe (not shown) connects spigot 88 to the crankcase volume. The breathing pipe returns oil vapor and droplets resulting from the wiping of tube 82 by plunging piston assembly 24. Importantly, the breathing pipe furnishes a low resistance path for air in swept volume 90; as shown in FIG. 2 and FIG. 3. Note that as the crankcase pressure rises due to the downward motion of the second scavenger pump piston 28, the pressure in swept volume 90 is dropping, and vice versa; producing the extremely desirable result that during reciprocation of the piston assembly very little flow work is done in the closed system. By this method crankcase pressure pulsations and energy losses due to flow work are removed. Best results are secured when the breathing pipe possesses a large flow area, similar to that of spigot 88, and is oriented so gravity returns oil droplets to the crankcase.

Crankshaft, main bearings, idler gear shafts, and other lower end lubrication is obtained by a separate gear pump (not shown).

Aftercooling

Figure 11:
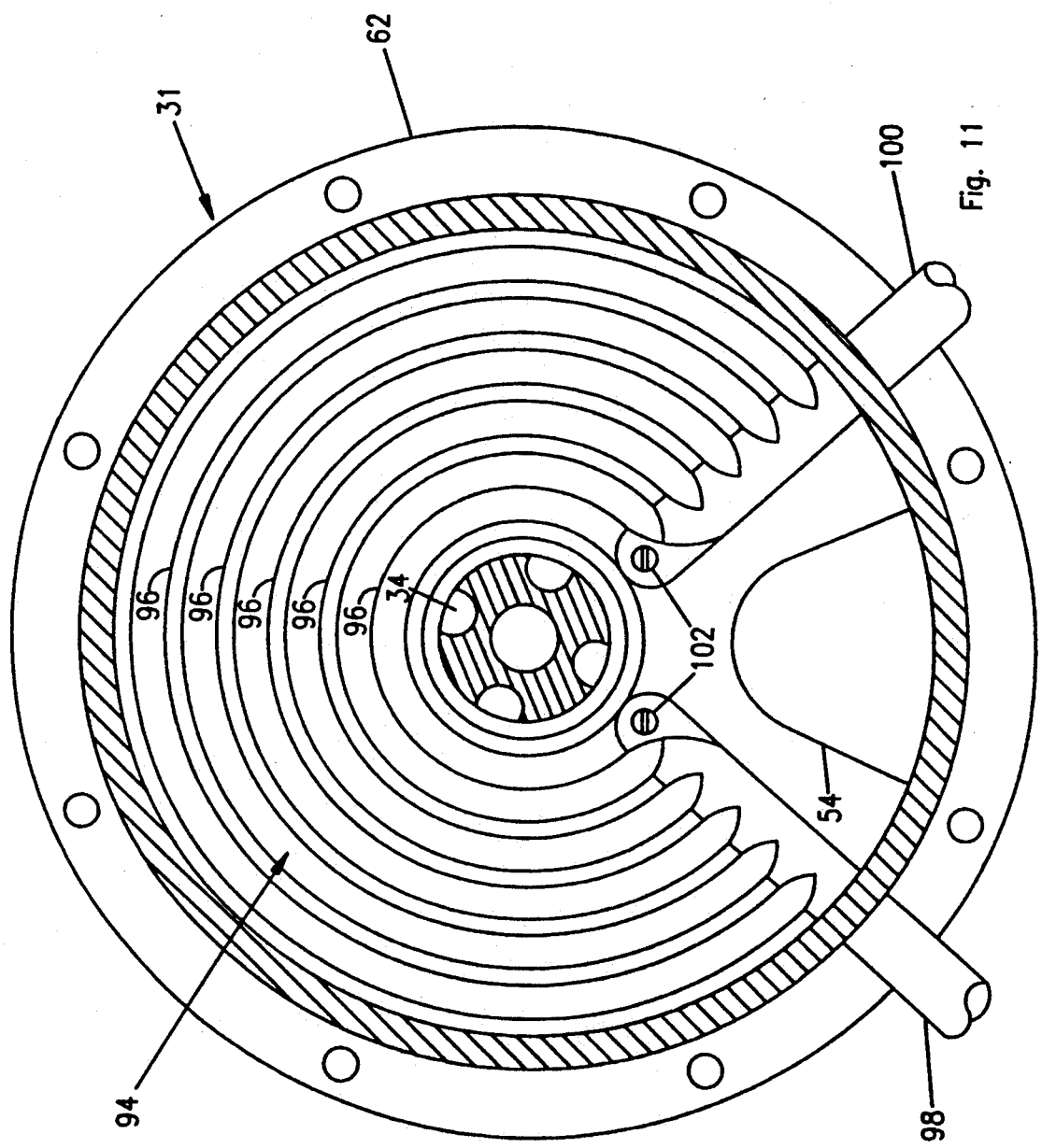
FIG. 11 is a plan view of an aftercooler heat exchanger.

Aftercooling is desired when the engine of the present invention is operated in the supercharged spark ignition configuration. The air temperature within the scavenger pump will rise during its compression. After the scavenge air is released into the power cylinder its final temperature will depend upon the ratio of the displacements of the scavenger pump and power cylinder. If no heat is extracted from the air, the final temperature within the power cylinder will be higher than ambient. Approximately for every ten degree temperature rise of the air in the power cylinder the engine will lose one percent of its horsepower. This undesirable heat of compression is removed by heat exchangers mounted within the clearance volume of each scavenger pump. By referring to FIG. 11 the planar heat exchanger 94 is seen mounted on the floorplate 62 of pumps 31. Typically, the heat exchanger is constructed by manifolding copper tubing 96 to liquid inlet pipe 98 and liquid outlet pipe 100. Copper tubing is highly preferred as it furnishes high thermal conductivity, large surface area, and suitable structural strength. The heat exchangers are in a closed loop heat transfer system possessing a pump and a liquid-to-air radiator (not shown). This radiator may be placed in tandem with the oil cooling radiator to take advantage of the thermoswitch controlled fan draught discussed in the section titled, "Cooling System."

The aftercooler of the present invention can produce final air temperatures within the power cylinder well below ambient; depending upon its thermodynamic design. High compression ratio scavenger pumps produce air temperatures on the order of 750 degrees F. This very warm air flows at a high velocity about the cool copper coils and loses considerable heat. The cooled compressed air then undergoes a sonic expansion into the power cylinder, and because of this nonadiabatic compression-expansion cycle obtains a low final temperature.

Note the copper mounting tabs 102 of the heat exchanger coils furnish an additional source of cooling for bearing 60 shown in FIG. 9.

Aftercoolers of typical design have substantial difficulty producing final air temperatures equal to ambient.

Exhaust System

Figure 12:
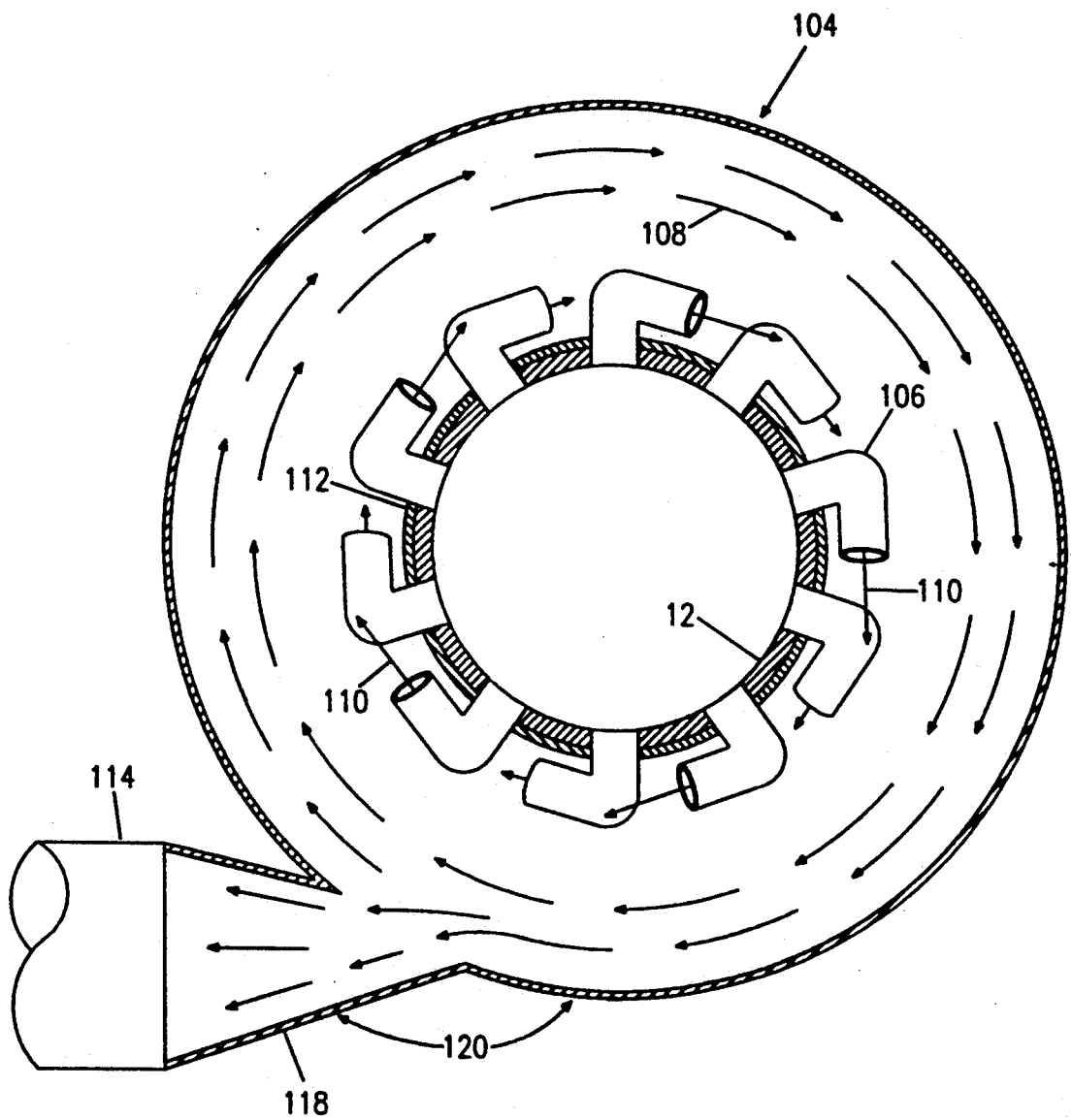
FIG. 12 is a cross-sectional plan view of the toric exhaust header.
Figure 13:
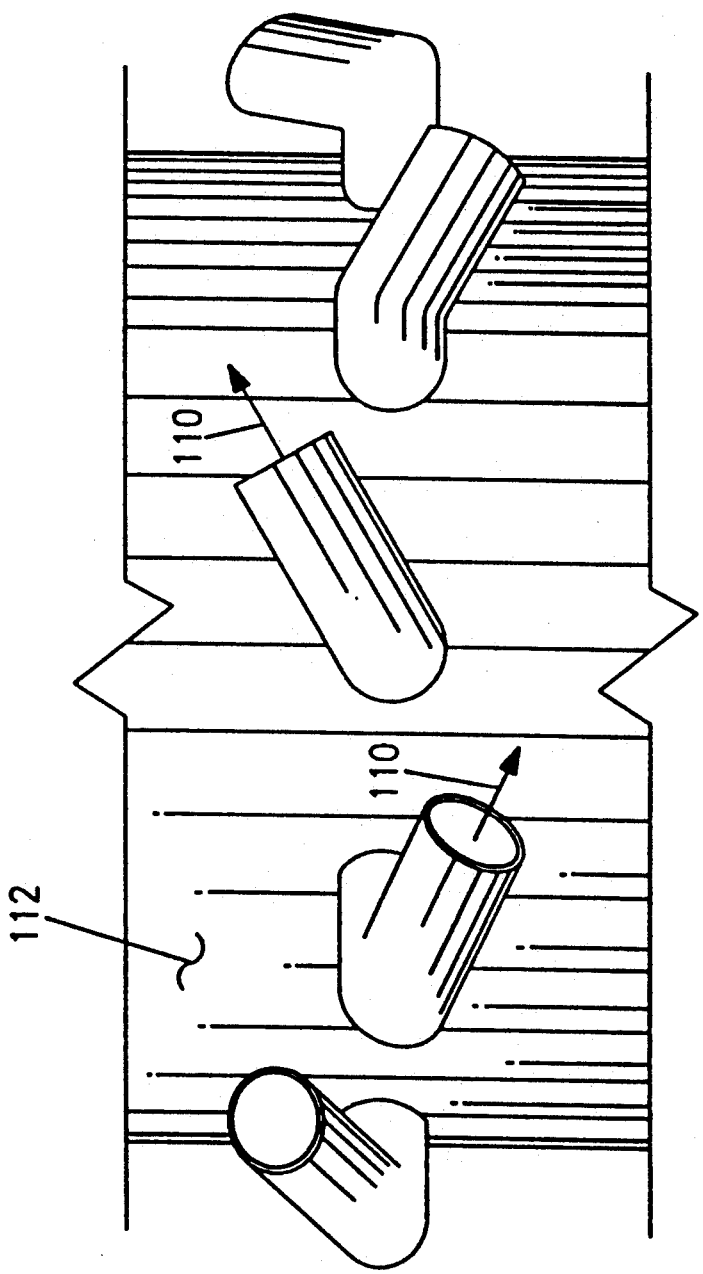
FIG. 13 shows the staggered elbows in elevation.

Both exhaust blowdowns are gathered by the toric exhaust header 104 shown in FIG. 1 and FIG. 12. The exhaust ports feed, thin wall, heat resistant steel elbows 106 so the exiting gas drives a high-speed cyclonic flow 108 within header 104. The elbows thread into the exhaust ports with Copaltite (R) as the sealant. The elbows are arranged in a staggered manner, as shown in FIG. 13, so the thrust vectors 110 of the individual gas streams do not interfere with one another.

The elbows 106 desirably increase the exhaust gas back pressure, due to their flow resistance, so supercharging is obtained. If the exhaust gas ports possesses low flow resistance, power cylinder pressures higher than atmospheric cannot be obtained.

Additionally, the relatively small diameter of the exhaust ports makes more of the engine stroke available for compression and expansion and so obtains greater thermal efficiency. In many prior art engines a large fraction of the stroke is sacrificed for large porting because of the low driving pressure of the scavenging flow. In the engine of the present invention the scavenge air is driven by pressures above critical, thereby obtaining very energetic scavenging flows.

The cyclonic flow smooths the exhaust gas pulsations, much like a flywheel effect, and materially assists in silencing the engine. The whirling flow also destroys the undesirable traveling pressure waves which reduce the engine performance because of the resulting fluctuations in the exhaust back pressure.

The toric header 104 is fabricated from a heat resistant steel and wrapped (not shown) with a lagging material to provide an acoustic barrier. A copper heat shield 112 protects the surface of the aluminum power cylinder from the hot gas, as shown in FIG. 12. The heat shield extends into the environment and extracts heat by fin action. The surface of heat shield 112 in contact with the exterior surface of the power cylinder is preferably flame sprayed with zirconium oxide to enhance the insulation function.

The toric exhaust header is emptied into the exhaust pipe 114 by a divergent or funnel shaped section 118 as shown in plan in FIG. 12. Divergent section 118 does not intersect the toric exhaust header tangentially; but at a slight angle labeled 120 in the figure.

Mechanical Balance

The following new methodology easily obtains the locations and masses of the eight counterbalance weights to obtain precise balance of the inertia forces of the reciprocating mass of the engine of the present invention. Importantly, the methodology is only applicable to engines possessing the configuration of the present invention.

The counterbalance weights are installed upon the four crankpin gears and upon the four idler gears that sandwich the connecting-rods. A computer source code, developed by us, is given in FIGS. 14A, B and C to automate the methodology. Also, an example is later given, based upon the dimensions of the engine of the present specification, to concretely illustrate the method.

The engine is comprised of a "housing" and "components." The housing consists of the "engine block," all stationary parts rigidly attached to it, and all mechanical components which move but do not experience, with respect to the engine block, a net displacement of their center of mass, C.M., during engine operation. Thus, rotary gears, if they are cylindrically symmetric and if their axis of rotation is rigidly attached in some manner to the engine block, are part of the housing. Let $M_h$ be the mass of the housing so defined, and let $R_h$ be a position vector to its center of mass from some convenient inertial origin of coordinates.

The components comprise the remainder of the engine, and consist of all moving mechanical parts whose centers of mass experience displacement relative to the housing center of mass during engine operation. Let $M_c$ be the mass of the components, so defined, and let $R_c$ be a position vector to its center of mass, relative to the inertial origin of coordinates.

Let $M_e = M_h + M_c$ be the total engine mass, let $V_h$ be the velocity of the housing center of mass, and let $V_c$ be the velocity of the components center of mass.

Upon an internal combustion event, the forces developed by the burning gases will act entirely upon the engine housing and components. Excluding the forces resulting from exhaust emission, which are ignorable, there will be no unbalanced force acting on the engine. Therefore, for an initially stationary isolated engine (free of external forces), its center of mass remains stationary during combustion and resulting operation. Conservation of momentum then holds; that is:

$$M_h V_h + M_c V_c = 0.$$

Adding and subtracting $M_c V_h$ in the left member of this equation, there results:

$$(M_h + M_c)V_h + M_c(V_c - V_h) = 0.$$

The mass in the left term is the total engine mass and the velocity in the right term is the velocity of the components center of mass relative to the housing. Let $V = V_c - V_h$. Then the above equation may be written as:

$$V_h = -(M_c/M_e)V.$$

The last equation gives the velocity of the housing with respect to any inertial frame of reference. It therefore gives a measure of engine vibration. A more direct measure of engine vibration is obtained by integrating the last equation to obtain engine housing linear displacement. Differentiating the last equation will yield acceleration, and hence unbalanced forces acting on the engine housing assembly.

In all cases, the process of reducing engine vibration will lead to the same result. A properly placed set of counterbalance weights will simultaneously reduce unbalanced engine housing forces, reduce engine housing net velocity, and reduce engine housing net excursion. Reducing any particular effect leads to the same result in all cases. As a matter of convenience, then, let the reduction of the engine housing's net excursion, S, be the assigned objective.

Let the crankpin gears 48, a part of the housing, be used for coordinate reference. In particular, let the crank angle turned through by these gears, $\phi$, be the independent variable for this analysis (either dead-center point is a convenient zero crank angle). Then, because of the rigid mechanical linkages throughout the engine, the coordinate positions of all component parts may be expressed in terms of the crank angle $\phi$. Therefore, the center of mass of the components relative to the engine housing may be so expressed, and the housing's displacement may then be computed in terms of crank angle $\phi$ from the formula developed immediately above. Any continuous cyclic function may be represented, as is well known, by a Fourier series. Since the engine of the present invention presents symmetry about the piston motion direction, it is only necessary to obtain such a Fourier representation for displacements along this direction. The engine housing's center of mass position, S, along this direction may be expressed as:

$$S = A - B\sin\phi - C\cos\phi - D\sin(2\phi) - E\cos(2\phi) - F_3\cos(3\phi) - F_4\cos(4\phi) - \ldots$$

The following paragraphs discuss the above asymmetrical Fourier representation of the oscillating center of mass position, including the composition of the coefficients of the series, and presents a first description of making the oscillation optimally small. The topology of the engine of the present invention, in combination with the new method of obtaining specialized counterbalance weights, produces a new and useful internal combustion engine.

The value of the constant A depends upon the choice of the inertial origin of reference. Since it is a constant it will have no effect upon engine displacement amplitude calculations and will hereafter be ignored. In this analysis the point of tangency of the pitch circles of the crankpin gears is chosen as the housing origin of reference for the component center of mass displacement calculations.

Values for the coefficients B, C, D and E are, it turns out, controllable in magnitude. They can be made to vanish, in fact, if four independent conditions can be found which govern their values. Such conditions are obtainable from the process of determining the angular positions and mass moments of the counterbalance weights which, when placed upon the four crankpin gears and the four idler gears, optimally reduce net engine housing excursion. These conditions, in equation form, are now presented for the engine of the present invention.

Use anglo-saxon units and let:

$g$ = gravity acceleration, 386.4 inch/second$^2$
$a$ = pitch circle radius of crankpin gears
$b$ = crank arm length (center-to-center)
$L$ = connecting-rod length (center-to-center)
$k$ = connecting-rod radius of gyration (from crankpin center), inch
$f$ = one-half of center-to-center separation of piston-pins
$c_1$ = radius arm to counterbalance weight C.M.s on crankpin gears
$c_2$ = radius arm to counterbalance weight C.M.s on idler gears (pitch circle radius a/2, rotating at twice engine frequency)
$\theta_1$ = angular position of left crankpin gear counterbalance weight, measured clockwise from a ray along the crank arm, degrees
$\theta_2$ = angular position of left idler gear counterbalance weight, measured clockwise from a reference zero degree ray which is defined to point right when the aforesaid ray along the crank arm points right, degrees
$m_p$ = mass of piston assembly plus the mass of the two piston pins, plus the mass of the piston rings, and plus the mass of the heat transfer fluid
$m_c$ = mass of both connecting-rods
$m_j$ = mass of both crankpins, including bearings and nuts, minus the mass of all material drilled from crankpin gears for crankpin installation
$M_e$ = total engine mass
$m_1$ = total mass of four crankpin gear counterbalance weights including fasteners, minus the mass of all drilled material for weight installation
$m_2$ = total mass of four idler gear counterbalance weights including fasteners, minus the mass of all drilled material for weight installation Define $\alpha = (a-f)/L$, $\beta = b/L$ and $\lambda = k/L$. Referencing the above Fourier expansion, the coefficients are:

$B = [b(m_p + m_c + m_j) + c_1 m_1 \cos\theta_1]/M_e$ $C = [L(m_p + \lambda m_c)K_1 - c_1 m_1 \sin\theta_1]/M_e$
$D = [c_2 m_2 \cos\theta_2]/M_e$
$E = [c_2 m_2 \sin\theta_2 + L(m_p + \lambda m_c)K_2]/M_e$
and,
$F_n = [L(m_p + \lambda m_c)K_n]/M_e,$ where, $$K_n = 2/\pi \int_0^\pi \sqrt{1 - (\alpha - \beta\cos\phi)^2} \cos(n\phi)d\phi$$

The coefficients B, C, D, and E can be made to simultaneously vanish by requiring, $m_1 c_1 = \sqrt{b^2(m_p + m_c + m_j)^2 + L^2(m_p + \lambda m_c)^2 K_1^2}$, $\theta_1 = \pi - ATAN[K_1 L(m_p + \lambda m_c)/b(m_p + m_c + m_j)],$ $\theta_2 = \pi/2,$ $m_2 c_2 = L(m_p + \lambda m_c)K_2.$

Illustrative Example of Balancing

For purposes of explanation only, and for a particular embodiment of the invention, assume an engine geometry as shown to scale in this specification. The power cylinder bore and stroke are, respectively, 5×4.25 inch. The scavenger pumps possess an identical stroke of 4.25 inch, but bores of 6 inches to obtain supercharging.

The engine balance computer program, shown in FIG. 14, requires engine geometry for input. The following gives an experimental, and well known, means of obtaining the radius of gyration, k, of a connecting rod by a pendulum method. The rod must be complete with its shell bearings and rod bolts.

The location of the connecting rod's center of mass, along the rod's shaft, is first found by balancing the rod upon a rigid knife edge; for relatively long rods it is not difficult to manually obtain suitable balance by trial. The shaft of the rod must be level when balance occurs; a round spirit level placed upon the rod shaft and directly over the knife edge facilitates this task. Read the distance, x, in inches, from the knife edge to the center of rotation of the crankpin "eye".

Suspend the connecting rod between parallel knife edges so it pivots about its center of rotation of the crankpin eye. Allow the rod to swing freely as a pendulum, with an initial angle of displacement not to exceed 5 degrees from its equilibrium hanging position. The time duration, T, of one complete oscillation (over and back), measured in seconds, is obtained as an average value from 25 to 30 oscillations.

The radius of gyration is computed as:

$k = T\sqrt{gx}\ /(2\pi)$ (inch).

| EXAMPLE OF ENGINE BALANCING | | |
|---|---|---|
| Engine geometry: | a = 4.0000 | inch |
| | b = 2.0104 | inch |
| | L = 9.5000 | inch |
| | k = 4.14 | inch (experimental) |
| | f = 1.0000 | inch |
| | $m_p$ = 7.7 | pounds (aluminum) |
| | $m_c$ = 3.62 | pounds (steel) |

| -continued | | |
|---|---|---|
| EXAMPLE OF ENGINE BALANCING | | |
| | $m_j$ = 1.66 | pounds (steel) |
| | $M_e$ = 150.00 | pounds (engine only) |
| | $c_1$ = 1.871 | inch |
| | $c_2$ = 0.882 | inch |
| Counterbalance weights: | $\theta_1$ = 166.34 | degrees |
| | $\theta_2$ = 90 | degrees |
| | 0.25*$m_1$ = 3.588 | pounds per crankpin gear |
| | 0.25*$m_2$ = 0.335 | pounds per idler gear |
| K values: | $K_1$ = 0.071951 | |
| | $K_2$ = −0.013371 | |
| | $K_3$ = 0.000517 | |
| Excursion envelope: | $2F_3$ = 0.0006 | inch |

FIG. 15 is a plot of the Fourier expression for S, as a function of crank angle, for the engine of the present invention possessing the sample parameters listed in the "EXAMPLE OF ENGINE BALANCING." The engine is treated as a "free body" without any means of restraint. The plot shows the excursion of the engine's center of mass without the specialized counterbalance weights installed. The distorted sine curve possesses a greatest peak-to-peak displacement near ⅛ inch.

FIG. 16 is a plot of the Fourier expression for S for the engine of the present example with its specialized counterbalance weights installed. Given the vanishing of the coefficients B, C, D, and E, in combination with the strongly decreasing magnitude of each term with increasing frequency, the center of mass excursion is dominated by the term representing the third harmonic and containing the coefficient $F_3$. It is easily seen the distorted sine curve possesses a greatest peak-to-peak displacement of about 0.0006 inch.

The optimal balance methodology produces a reduction in the envelope of engine vibration due to mechanical forces by a factor near 500.

Note the total engine mass will increase when rigidly attached to an automobile transmission or the like. This added mass will further attenuate the amplitude of the excursion envelope. For this reason the mass of rigidly attached objects should be included in the total engine mass for accurate excursion envelope predictions.

FIG. 17 shows the counterbalance weights 122 and 124 installed on the exterior of the four crankpin gears and the four idler gears according to the computer output. The weights are located by the previously defined rays, angles, and radius arms. The hollow semicircle is chosen for the shape of the weights 122 and 124.

The ray 126, drawn between the centers of the main bearings 128, and also passing through the centers of the crankpins 46 (each denoted by dashed circles since they are sandwiched between the crankpin gears), is used to reference the angular positions 130 (166.34 degrees) for the placement of the centroids 132 of weights 122. Since the weights 122 have an outside radius of 3.710 inches and an inside radius of 2.000 inches; their centroid falls 1.871 inches from the center of the main bearings as required. Each is required to weigh 3.588 pounds; so the thickness of each steel semicircle is 0.8355 inch.

The ray 134, drawn between the centers of the idler gear axles, is used to reference the angular positions 136 (90 degrees) for the placement of the centroids 138 of weights 124. Since the weights 124 have an outside radius of 1.710 inches and an inside radius of 1.000 inches; their centroid falls 0.882 inches from the center of the axles as required. Each is required to weigh 0.335 pounds; so the thickness of each steel semicircle is 0.3957 inches.

Care must be taken to allow for any missing mass due to the counterbalance weight fasteners. The socket head screws 140 shown in FIG. 17 would require the missing mass due to the allen sockets to be made up by an increase in counterbalance weight thickness.

We prefer to drill lightening holes in the crankpin and idler gears instead of adding the counterbalance weights. The drillings are sized and located to produce equal, but negative, mass moments 180 degrees from the computer located mass moments. The drillings are resolved to fall on each side of the crankpin. But upon the idler gears, the drillings simply remove mass equal to the counterbalance mass, but are 180 degrees away from the computer indicated location. By this means all the gears remain planar.

While a particular and preferred form of internal combustion engine has been described hereinabove, it is appreciated that changes may be made in the illustrated form, some of which have been suggested hereinabove, without departing from the spirit of the present invention. Accordingly, it is intended that the present invention be limited in scope only by the terms of the following claims.

We claim:

1. A two-stroke cycle internal combustion engine comprising:
   (a) first, second, and third axially elongated cylinders disposed in axial alignment;
   (b) a piston assembly possessing first, second, and third pistons disposed in axial alignment, spaced axially apart, and fastened upon first and second hollow rods;
   (c) said first and second hollow rods joined together by a hollow nipple within the interior of said second piston, thereby forming a sealed toric cavity within said second piston;
   (d) said piston assembly disposed to reciprocate in the axial direction within said axially aligned first, second, and third cylinders, wherein said first, second, and third pistons possess top and bottom dead center positions within said cylinders;
   (e) said second cylinder, closed at one end by a first head and closed at the remaining end by a second head, in which said second piston possesses a double crown, thereby forming separate first and second combustion chambers;
   (f) said second cylinder possessing a multiplicity of openings about the equator of said second cylinder, thereby forming exhaust gas ports that are fully open when said second piston is in either said dead center position;
   (g) the reciprocation is driven by alternating deflagrations within said separate combustion chambers of said second cylinder;
   (h) said first cylinder joined and separated from said second cylinder by said first head, wherein said first head possesses a first gland to guide said first rod during said reciprocation;
   (i) said third cylinder joined and separated from said second cylinder by said second head, wherein said second head possesses a second gland to guide said second rod during said reciprocation;
   (j) said first and third cylinders and first and third pistons form first and second scavenging pumps, each possessing a rotary disc valve, and fresh air intake ducts, for phase controlled fresh air intake means;
   (k) means for removing the heat of compression of the compressed fresh air within said scavenging pumps;
   (l) phase controlled means for scavenging and releasing the spent exhaust gas from said combustion chambers into a toric exhaust gas header that surrounds said exhaust gas ports;
   (m) means to extract heat from said engine by utilizing the oil from the engine's crankcase as the cooling medium;
   (n) means to convert said reciprocation into a rotary motion;
   (o) means to utilize said rotary motion to drive idler gears; and
   (p) means to lessen the crankcase pressure pulsations resulting from said reciprocation of said first and second scavenger pumps.

2. The engine as recited in claim 1, wherein said piston assembly includes:
   a proximal end and a distal end;
   said first piston is located at said distal end and joined to said second piston by said first hollow rod;
   said third piston is located at said proximal end and joined to said second piston by said second hollow rod;
   said first and third pistons possess gas sealing rings; and
   said second piston possesses pinned gas sealing rings.

3. The engine as recited in claim 1, wherein said second scavenging pump penetrates and rigidly joins said crankcase.

4. The engine as recited in claim 1, wherein said rotary disc valves are mutilated thin circular discs, and reside transversely between said first scavenger pump and said first head, and between said second scavenger pump and said second head, and the axis of disc rotation is coincident with said axial alignment, and said discs possess means to rotate at the engine frequency, thereby opening and closing said fresh air intake ducts of said first scavenger pump and said second scavenger pump to obtain said phase controlled fresh air intake means.

5. The engine as recited in claim 1, wherein said means for removing the heat of compression includes:
   heat exchangers contained within the clearance volumes of said scavenger pumps;
   said heat exchangers communicate with a pump and a liquid to air radiator to form a closed loop heat transfer system; and
   a circulating heat transfer fluid within said closed loop heat transfer system, thereby removing said heat of compression of said compressed fresh air.

6. The engine as recited in claim 1, wherein said scavenging is obtained by the phase controlled transfer of the said compressed fresh air into said first and second combustion chambers from said first and second scavenging pumps when said exhaust gas ports are opened by said second piston.

7. The engine as recited in claim 6, wherein said phase controlled transfer of said compressed fresh air is obtained by flutelike slots in said hollow rods adjacent to said first and third pistons, thereby allowing the phased communication of said first combustion chamber with said first scavenging pump, and said second combustion chamber with said second scavenging pump, through said first and second glands.

8. The engine as recited in claim 1, wherein said heat extraction means includes:
- a positive displacement oil pump, possessing a pressure relief valve, to force oil from said crankcase through a filter and oil cooler;
- said oil cooler possesses a ducted electric fan controlled by a thermoswitch to draw air through said oil cooler when required;
- said oil cooler feeds said oil into said first hollow rod of said piston assembly during said reciprocation through a stationary thin wall tube axially aligned and penetrating into the interior of said first hollow rod;
- said cool oil flows rectilinearly through said piston assembly and returns to said crankcase by said second hollow rod, thereby maintaining mechanical balance; and
- said toric cavity within said second piston contains a small amount of heat transfer fluid.

9. The engine as recited in claim 1, wherein said converting means includes a configuration comprising:
- two crankshafts whose single crankpins are phased synchronized by gearing to possess mirror symmetry during their rotation;
- said crankshafts possess equal crank arm lengths;
- the axis of said mirror symmetry lies on said axis of alignment;
- said idler gears engage said gearing and preserve said mirror symmetry and rotate at twice the frequency of said crankshaft rotation;
- said idler gears mesh, thereby reducing the stress upon the teeth of said synchronizing gearing;
- said second scavenging piston possesses two piston pins whose midpoint of separation lies on said axis of alignment;
- each said crankpin attaches to each said piston pin by a connecting rod;
- said configuration causing the engine's center of mass oscillation along the direction of said axis of alignment to be analytically described by a Fourier cosine series whose argument is the crankshaft angle, plus a sine term whose argument is said crankshaft angle, and plus a sine term whose argument is twice said crankshaft angle; and
- means for balancing the reciprocating mass of said engine utilizing counterbalance weights installed upon said gearing and idler gears, thereby optimally reducing the shaking forces.

10. The engine as recited in claim 9, wherein said balancing means includes a computer aided method to obtain the masses and locations of said counterbalance weights upon said gearing and idler gears to eliminate the coefficients of the first and second terms of said Fourier cosine series, as well as the coefficient of both of said sine terms, thereby diminishing said center of mass oscillation.

11. The engine as recited in claim 4, wherein said means to rotate at engine frequency includes:
- each said rotary disc valve engages by spline fit the driven gear of a set of bevel gears;
- the gear ratio of said bevel gears is 1 to 2, wherein the driven gear obtains one-half the rotational frequency of the drive gear;
- rotary power take off is obtained from said idler gears; and
- said rotary power from said idler gears is transmitted to each said drive gear by individual flexible shaft drives.

12. The engine recited in claim 1, wherein said means to lessen the crankcase pressure pulsations includes:
- a breathing pipe of substantial cross sectional area, possessing a proximal end and a distal end;
- the proximal end of said breathing pipe communicates with a swept volume of said second scavenging pump at the crankcase side of said second scavenging pump;
- the distal end of said breathing pipe communicates with a swept volume of said first scavenging pump at the distal end of said first scavenging pump; and
- said breathing pipe is oriented to return oil mist and droplets to said crankcase by the force of gravity.

* * * * *